US 6,720,091 B2

(12) United States Patent
Ohnishi et al.

(10) Patent No.: US 6,720,091 B2
(45) Date of Patent: Apr. 13, 2004

(54) POLYMERIC FLUORESCENT SUBSTANCE, POLYMERIC FLUORESCENT SUBSTANCE AND POLYMER LIGHT-EMITTING DEVICE USING THE SAME

(75) Inventors: Toshihiro Ohnishi, Tsukuba (JP); Takanobu Noguchi, Tsukuba (JP); Yoshiaki Tsubata, Tsukuba (JP); Masato Ueda, Tsukuba (JP); Shigeru Sasaki, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/808,028

(22) Filed: Mar. 15, 2001

(65) Prior Publication Data

US 2002/0033910 A1 Mar. 21, 2002

(30) Foreign Application Priority Data

| Mar. 16, 2000 | (JP) | 2000-074072 |
| May 19, 2000 | (JP) | 2000-147620 |
| Sep. 4, 2000 | (JP) | 2000-266643 |

(51) Int. Cl.[7] .......... G02F 1/1335; B05D 5/12; C09K 11/02; H05B 33/00
(52) U.S. Cl. .......... 428/690; 428/917; 313/504; 313/506; 252/301.35; 427/66; 349/69; 528/129; 528/230; 528/247; 528/266; 528/373; 528/397
(58) Field of Search .......... 427/66; 428/690, 428/917; 313/504, 506; 252/301.16, 301.35; 349/69; 528/129, 230, 247, 266, 373, 397

(56) References Cited

U.S. PATENT DOCUMENTS

| 5,352,951 A | 10/1994 | Kardon et al. ............. 313/502 |
| 5,807,974 A | 9/1998 | Kim et al. .................. 528/366 |
| 5,821,002 A | * 10/1998 | Ohnishi et al. ............. 428/690 |
| 5,905,128 A | 5/1999 | Chen et al. ................. 526/279 |
| 6,004,681 A | 12/1999 | Epstein et al. .............. 428/457 |
| 6,458,909 B1 | 10/2002 | Spreitzer et al. | 
| 2003/0088050 A1 | 5/2003 | Spreitzer et al. |

FOREIGN PATENT DOCUMENTS

| EP | 0 443 861 A2 | 8/1991 |
| EP | 0 637 621 A1 | 2/1995 |
| EP | 0 725 120 A1 | 8/1996 |
| EP | 0 825 207 A2 | 2/1998 |
| JP | 08-188773 A * | 7/1996 |
| JP | 9-104732 A | 4/1997 |
| JP | 9-124733 A | 5/1997 |
| JP | 9-125054 A | 5/1997 |
| JP | 10-1665 A | 1/1998 |
| JP | 10-172768 A | 6/1998 |
| JP | 2000-48960 A | 2/2000 |
| WO | WO 98/27136 A1 | 6/1998 |
| WO | WO 99/24526 A1 | 5/1999 |

OTHER PUBLICATIONS

Database WPI, Section Ch, Week 199336, Derwent Publication Ltd., London, GB (corresponding to JP 05–202355).
Derwent Abstract, Databae WPI, Section CH, Week 199336 corresponding to JP 05–202355.

* cited by examiner

*Primary Examiner*—Cynthia H. Kelly
*Assistant Examiner*—Dawn Garrett
(74) *Attorney, Agent, or Firm*—Sughrue Mion, PLLC

(57) ABSTRACT

A polymeric fluorescent substance or polymeric fluorescent substance solution is disclosed which can attain higher luminous efficiency as a polymer LED. The polymeric fluorescent substance has a specific content of water or poor solvent. Also disclosed is an organic electroluminescence device comprising at least one light-emitting layer that contains substantially no particle-like foreign materials having a diameter of more than 1 $\mu$m and that has few dark spots.

58 Claims, No Drawings

POLYMERIC FLUORESCENT SUBSTANCE, POLYMERIC FLUORESCENT SUBSTANCE AND POLYMER LIGHT-EMITTING DEVICE USING THE SAME

BACKGROUND OF THE INVENTION

1. Field of the Invention

The present invention relates to a polymeric fluorescent substance, a polymeric fluorescent substance solution, and a polymer light-emitting device (hereinafter, referred to as polymer LED) using the same.

2. Background Information

In polymer light-emitting devices (hereinafter, sometimes referred to as inorganic EL device) using an inorganic luminescent material as a light-emitting material are used for example for sheet light sources as back-lights and displays such as a flat panel display and the like, however, an alternating current of high voltage has been required for light emission.

Recently, there has been reported an polymer light-emitting device (hereinafter, sometimes referred to as organic EL device) having a double-layer structure in which an organic fluorescent dye as a light-emitting layer is laminated with an organic charge transport compound used in photosensitive layer for electrophotography and the like (Japanese Patent Application Laid-Open (JP-A) No. 59-194393). Since organic EL devices have characteristics that light emissions of a lot of colors are obtained easily in addition to low voltage driving and high luminance as compared with inorganic EL devices, there have been reported a lot of trials regarding device structures, organic fluorescent dyes and organic charge transport compounds of organic EL devices [Jpn. J. Appl. Phys., 27, L269 (1988), J. Appl. Phys., 65, 3610 (1989)].

Further, apart from organic EL devices using mainly organic compounds having a lower molecular weight, polymer light-emitting devices using light-emitting materials having a higher molecular weight have been proposed in such as WO 9013148 published specification, JP-A No. 3-244630, Appl. Phys. Lett., 58, 1982 (1991). WO 9013148 discloses in the Examples an EL device using a thin film of poly(p-phenylene vinylene) obtained by forming a film of a soluble precursor on the electrode and subjecting it to a heat treatment to convert the precursor into a conjugated polymer.

Further, JP-A 3-244630 has exemplified conjugated polymers having a feature that they are themselves soluble in a solvent and needs no heat treatment. Also in Appl. Phys. Lett., 58, 1982(1991), apolymeric light-emitting materials soluble in a solvent and a polymer LED fabricated using the same are described.

Conventionally, as the light-emitting materials used in these polymer LEDs, in addition to the above-described poly(p-phenylene vinylene), there have been reported poly-fluorene (Jpn. J. Appl. Phys., 30, L1941 (1991)), poly p-phenylene derivative (Adv. Mater., 4, 36 (1992)) and the like.

Since polymer LED can be film formed as an organic layer easily by coating with using a soluble polymeric fluorescent substance, it is advantageous to large area formation, or cost lowering, in comparison with the case where a low molecule fluorescent substance is deposited, and as it is a polymer, mechanical strength of the film is also excellent.

However, even if polymer LED is manufactured with using the same polymeric fluorescent substance, the luminous efficiency of polymer LED may change with manufacture conditions of the polymeric fluorescent substance or the polymeric fluorescent substance solution used for coating etc. Thus a polymeric fluorescent substance or a polymeric fluorescent substance solution which can attain high luminous efficiency as polymer LED has been required.

Moreover, it is known that, in an organic electroluminescence device, a defect called dark spots by which the light is not emitted tends to generate, and the growth of dark spots deteriorates remarkably the display quality of the organic electroluminescence device. In order to solve this problem, disclosed are a method of suppressing generation of dark spots, and a method of suppressing growth of dark spots (JP-A 9-148066 official report).

About the method of suppressing generation of dark spots, JP-A 10-172768 suggests that they are generated from the defects of a transparent electrode substrate, for example, projections of a transparent electrode, cracks of glass and exterior adhesion particles, and discloses a method of reducing density of defects of a transparent electrode substrate. JP-A 6-124785 discloses a method of reducing foreign materials, projections, and holes in the high polymer film, at the interface of the high polymer film and the 1st electrode, and at the surface of the 1st electrode, in a device using an electrode on a high polymer film.

Especially when using polymeric materials for an organic electroluminescence device, for example, JP-A 8-188773, 7th page describes when forming a thin film from a hole transporting polymer solution by coating, the solution is filtrated with a 0.1 $\mu$m filter and used. JP-A-2000-48960, page 18 describes the use of the solution filtrated with a 0.45 $\mu$m filter, for coating a solution of a polythiophene derivative from as charge injection layer material, and polyvinyl carbazole as a hole transportation layer material. JP-A 9-124733 describes that, when using a vinyl type polymer as a luminescence polymer, a solution is filtrated with a 0.2 $\mu$m filter before the application.

Moreover, JP-A 9-104732 describes that a solution of a polymer in which conjugated structure is bonded by ether group is filtrated with a micro filter, and the solution is coated. However, it is not described that a device having few dark spots with using a conjugated polymer for an organic light emitting layer.

An object of the present invention is to provide a polymeric fluorescent substance or polymeric fluorescent substance solution which can attain higher luminous efficiency as a polymer LED, a polymer LED thereof, and a process for producing the same.

Another object is to provide an organic electroluminescence device using a conjugated polymer and having few dark spots for the organic light emitting layer.

As a result of extensive studies, the present inventors have found that a polymer LED produced with using a polymeric fluorescent substance having a specific content of water or poor solvent, or a polymeric fluorescent substance solution containing a specific content of water or poor solvent, has a high luminous efficiency. The present inventors also have found that a polymer LED comprising at least one light-emitting layer containing substantially no particle-like foreign material having a diameter of more than 1 $\mu$m can provide a polymer LED having few dark spots with keeping the characteristics of the polymer LED.

SUMMARY OF THE INVENTION

Accordingly, the present invention relates to followings.

[1] A polymeric fluorescent substance which emits fluorescence in solid state, has a number-average molecular weight in terms of polystyrene of $1 \times 10^3$ to $1 \times 10^7$, and at least one repeating unit of the following general formula (1), and the amount of water content measured by Karl-Fischer method is not more than 1000 ppm (weight):

in the formula, $Ar_1$ is a divalent group forming carbon-carbon bonds with adjacent two groups respectively, the divalent group being an arylene group having 6 to 60 carbon atoms participating in conjugation or a heterocyclic compound group having 4 to 60 carbon atoms participating in conjugation, and the arylene group and heterocyclic compound group may further have a substituent; each of R1 and R2 independently represents a group selected from the group consisting of hydrogen atom, linear, branched or cyclic alkyl groups having 1 to 20 carbon atoms, aryl groups having 6 to 60 carbon atoms, heterocyclic compound groups having 4 to 60 carbon atoms and a cyano group, and the aryl group and heterocyclic compound group may further have a substituent; and the symbol k is 0 or 1.

[2] A polymeric fluorescent substance solution containing 0.1 to 5% by weight of a polymeric fluorescent substance which emits fluorescence in solid state, has a number-average molecular weight in terms of polystyrene of $1 \times 10^3$ to $1 \times 10^7$, and has at least one repeating unit represented by the above general formula (1) in the above [1], and the water content of the solution is not more than 1000 ppm (weight).

[3] A polymer fluorescent substance which emits fluorescence in solid state, has a number-average molecular weight in terms of polystyrene of $1 \times 10^3$ to $1 \times 10^7$, has at least one repeating unit of the above general formula (1), and the amount of contained poor solvent measured by gas-chromatography method is not more than 10000 ppm (weight).

[4] A polymer fluorescent substance solution in which a polymer fluorescent substance is dissolved in an organic solvent in a concentration of 0.1 to 5% by weight; the polymer fluorescent substance emits fluorescence in solid state, has a number-average molecular weight in terms of polystyrene of $1 \times 10^3$ to $1 \times 10^7$, has at least one repeating unit represented by the above general formula (1), and the amount of a poor solvent measured by gas-chromatography method is not more than 10000 ppm (weight).

[5] A process for producing a polymer light-emitting device comprising at least one light-emitting layer containing a polymer fluorescent substance, placed between a pair of an anode and a cathode at least one of which is transparent or semi-transparent, the light-emitting layer contains a polymer fluorescent substance, wherein said process contains a step of forming a light emitting layer by using a solution in which the polymer fluorescent substance of [1] or [3] is dissolved in an organic solvent.

[6] A process for producing a polymer light-emitting device comprising at least one light-emitting layer containing a polymer fluorescent substance, placed between a pair of an anode and a cathode at least one of which is transparent or semi-transparent, wherein said process contains a step of forming a light emitting layer by using the polymer fluorescent substance solution of [2] or [4].

[7] A polymer light-emitting device comprising at least one light-emitting layer containing a polymer fluorescent substance, placed between a pair of an anode and a cathode at least one of which is transparent or semi-transparent, wherein, the light-emitting layer contains a polymer fluorescent substance of [1] or [3].

[8] A polymer light-emitting device comprising at least one light-emitting layer containing a polymer fluorescent substance, placed between a pair of an anode and a cathode at least one of which is transparent or semi-transparent, wherein, the light-emitting layer is produced with using a polymer fluorescent substance solution of [2] or [4].

[9] A polymer light-emitting device comprising at least one light-emitting layer containing a polymer fluorescent substance, placed between a pair of an anode and a cathode at least one of which is transparent or semi-transparent, wherein the light-emitting layer does not contain a particle-like foreign material having a diameter of more than 1 μm substantially.

[10] A process for producing a polymer light-emitting device which comprises at least one light-emitting layer containing a polymeric fluorescent substance, said light-emitting layer is placed between a pair of an anode and a cathode at least one of which is transparent or semi-transparent, wherein the process comprises steps of forming a light emitting layer by:

preparing a coating material by filtrating a polymeric fluorescent substance solution through a filter having pore diameter of 1 μm or less; and forming a light-emitting layer using the polymeric fluorescent substance solution.

[11] A polymer light-emitting device produced by the above [10].

[12] A sheet light source using a polymer light-emitting device of [7], [8], [9] or [11].

[13] A segment display apparatus using a polymer light-emitting device of [7], [8], [9] or [11].

[14] A dot matrix display apparatus using a polymer light-emitting device of [7], [8], [9] or [11].

[15] A liquid crystal display apparatus using a polymer light-emitting device of [7], [8], [9] or [11] as a back light.

The polymeric fluorescent substance used in the present invention is a polymeric fluorescent substance which emits a fluorescence in solid state and having a number-average molecular weight of $1 \times 10^3$ to $1 \times 10^7$ in terms of polystyrene, and suitably $1 \times 10^4$ to $1 \times 10^7$. The polymeric fluorescent substance contains at least one repeating unit represented by the above formula (1), and the amount of the repeating unit is suitably from 10 mol % to 100 mol % based on the total amount of the repeating units, more suitably from 50 mol % to 100 mol %, and further suitably from 90 mol % to 100 mol.

In the above formula (1), $Ar_1$ is a divalent group forming carbon-carbon bonds with adjacent two groups respectively, the divalent group being an arylene group having 6 to 60 carbon atoms participating in conjugation or a heterocyclic compound group having 4 to 60 carbon atoms participating in conjugation, and the arylene group and heterocyclic compound group may further have a substituent.

$Ar_1$ can be selected so as not to deteriorate the fluorescence property of the polymeric fluorescent substance, and exemplified are divalent groups below described chemical formulas 3 to 16.

[Formula 3]
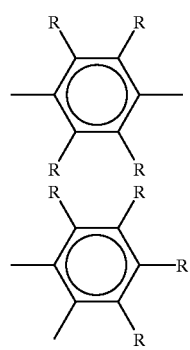 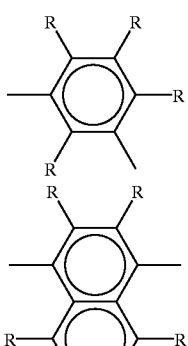
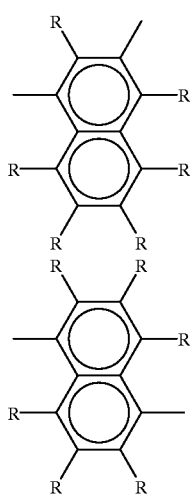 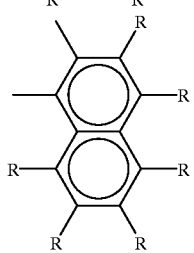
[Formula 4]
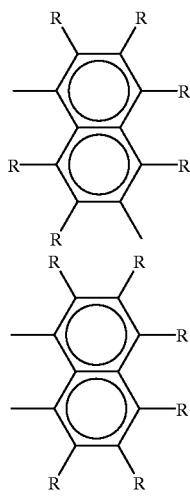 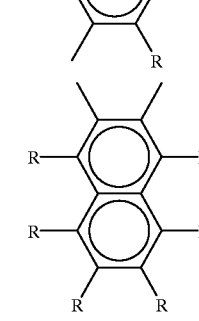
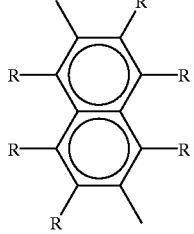 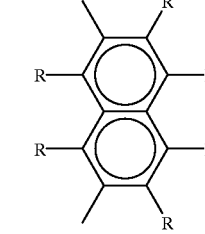
-continued
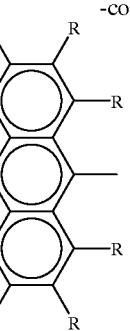 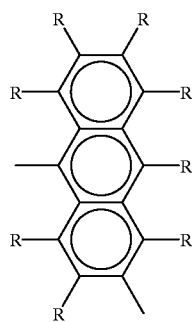
[Formula 5]
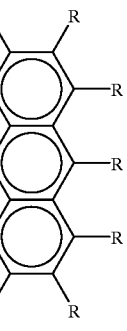 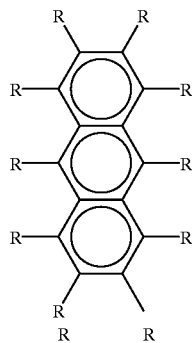
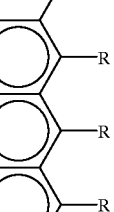 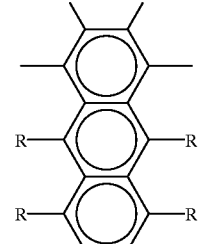
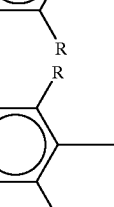 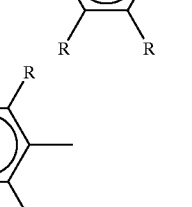
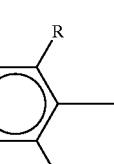 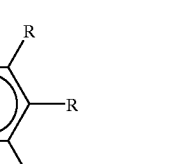
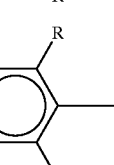 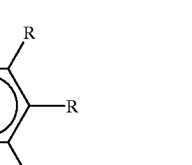
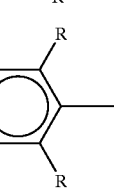 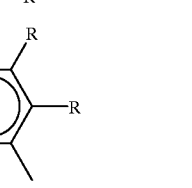

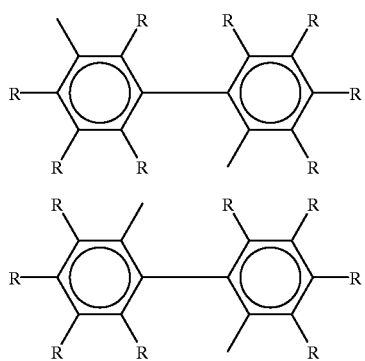
[Formula 6]
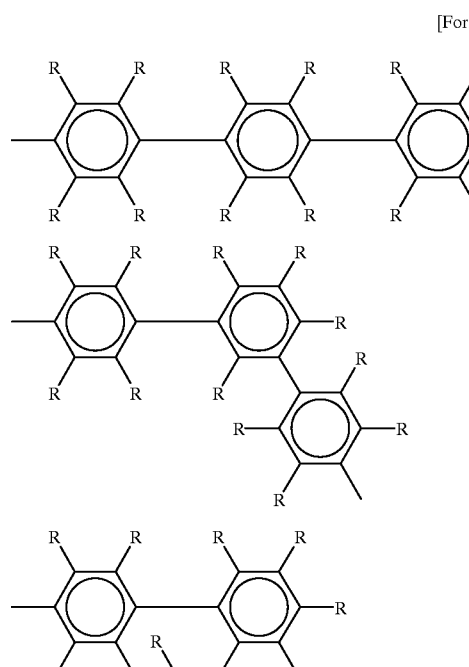
[Formula 7]
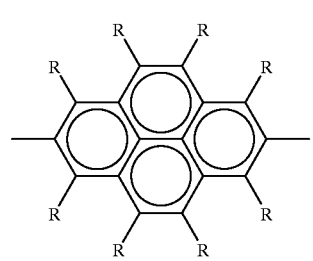
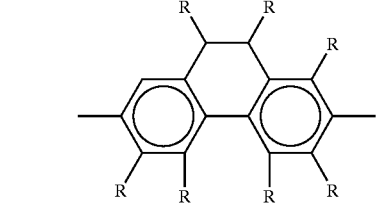
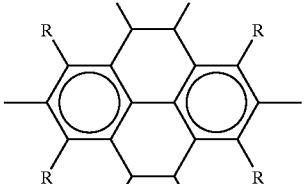
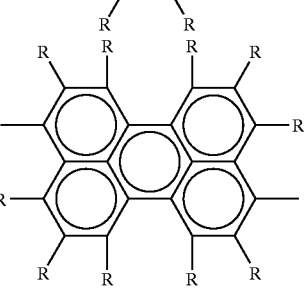
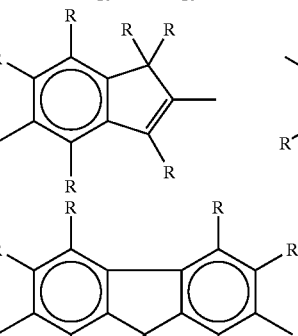
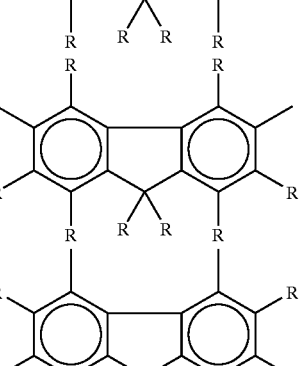
[Formula 8]
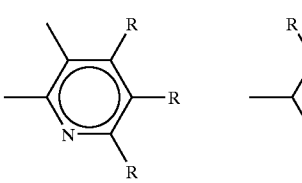

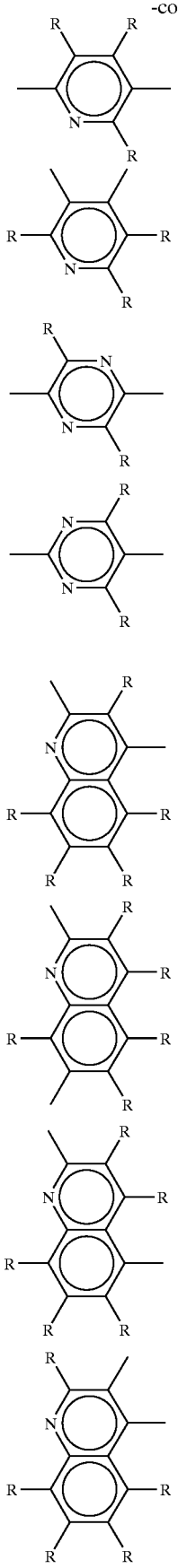
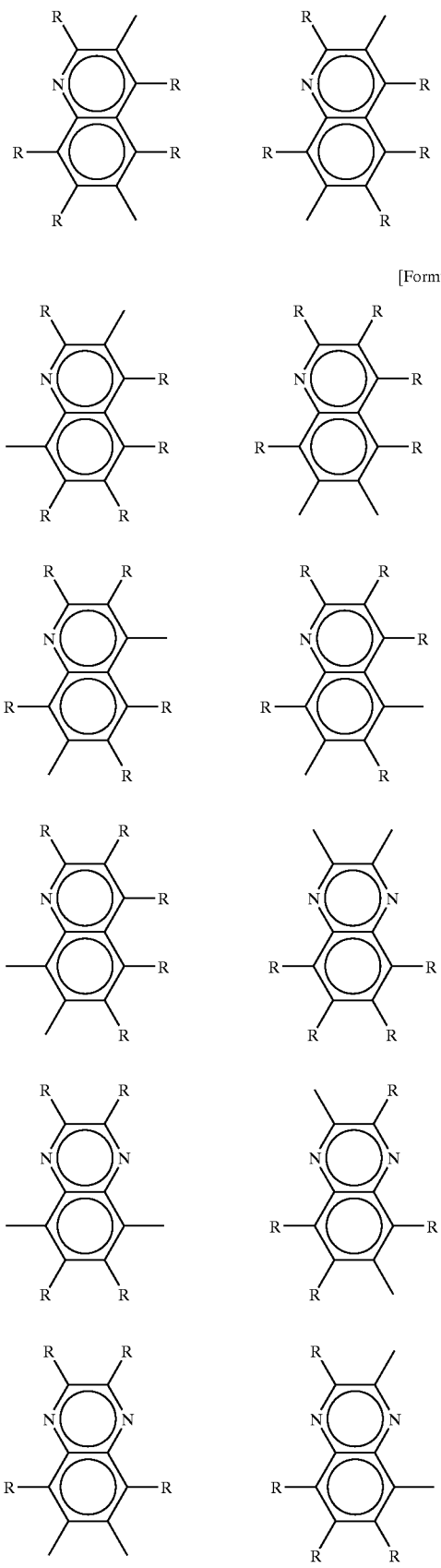
[Formula 9]
[Formula 10]

[Formula 11]
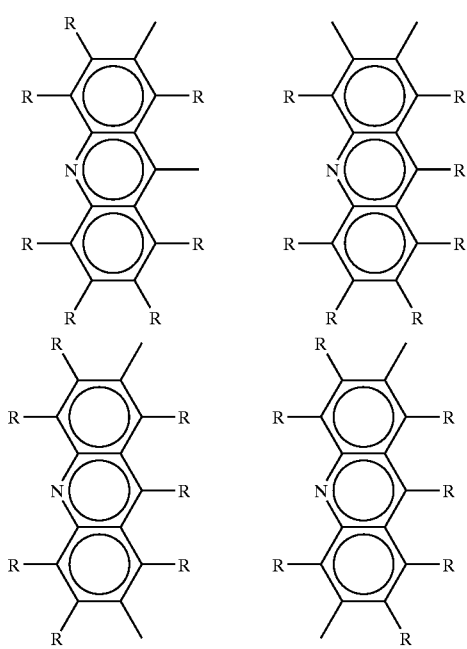
[Formula 12]
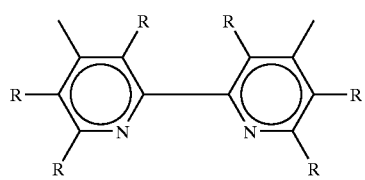
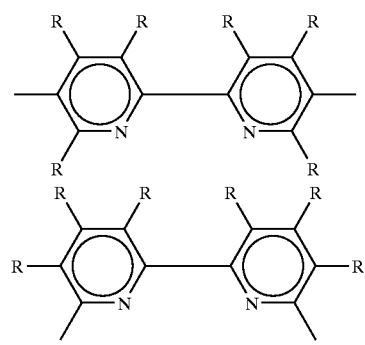
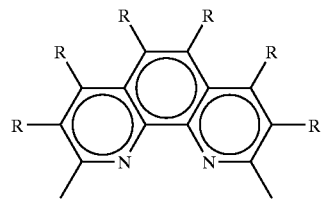
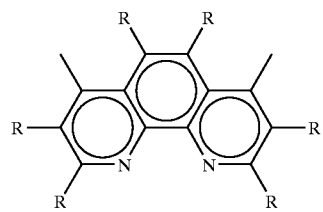
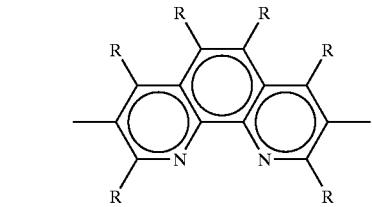
[Formula 13]
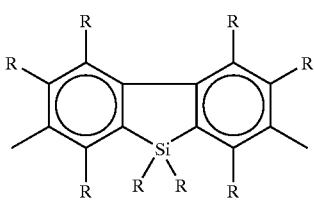
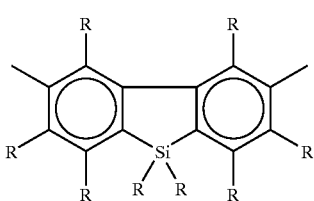
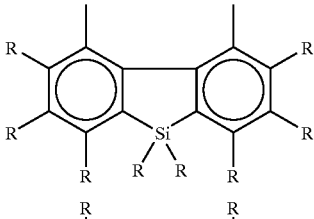
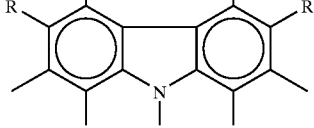
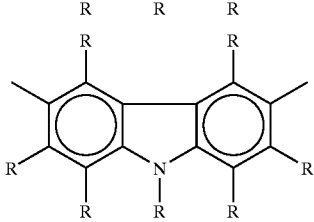
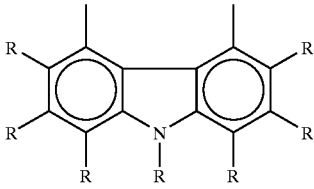
[Formula 14]
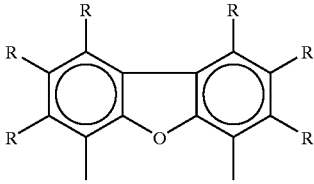

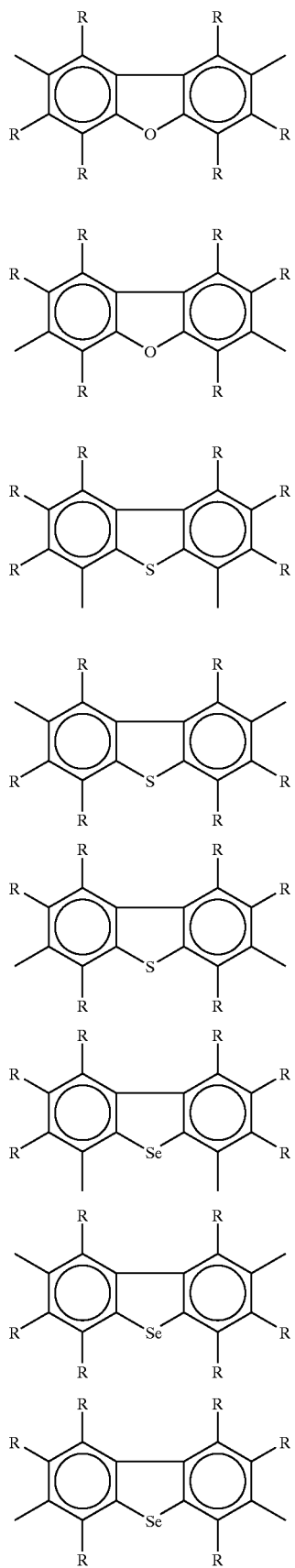
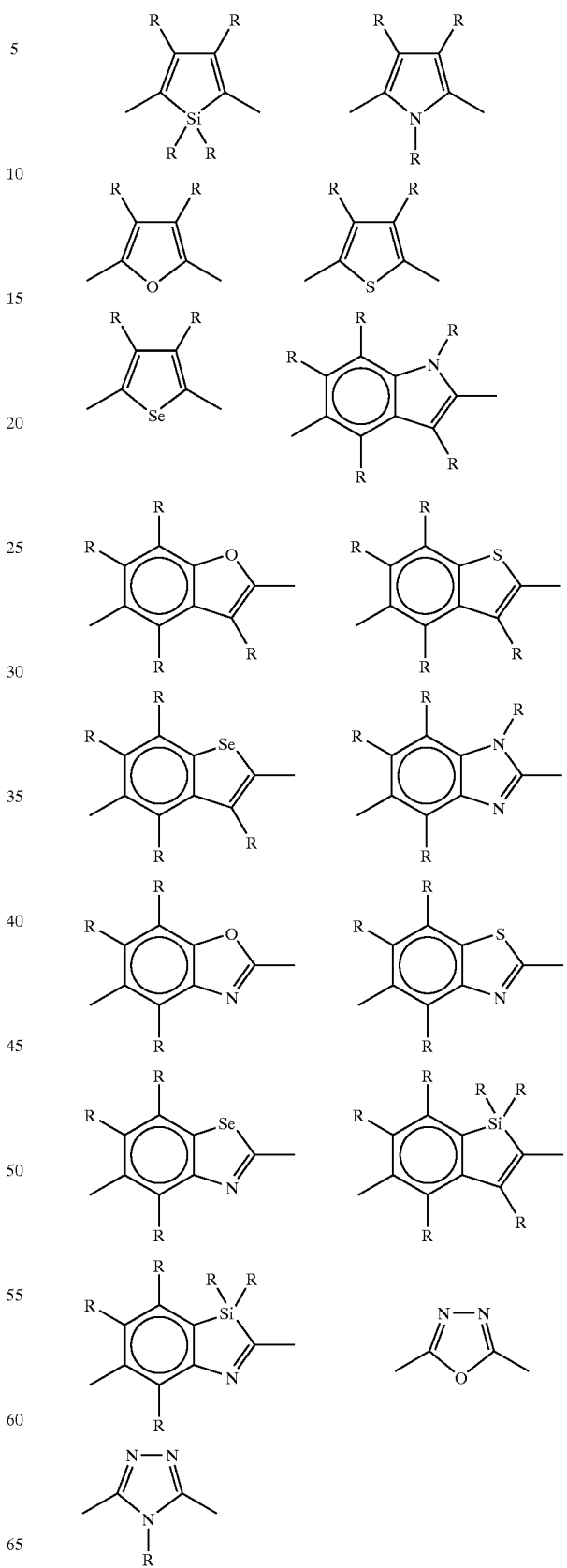

-continued

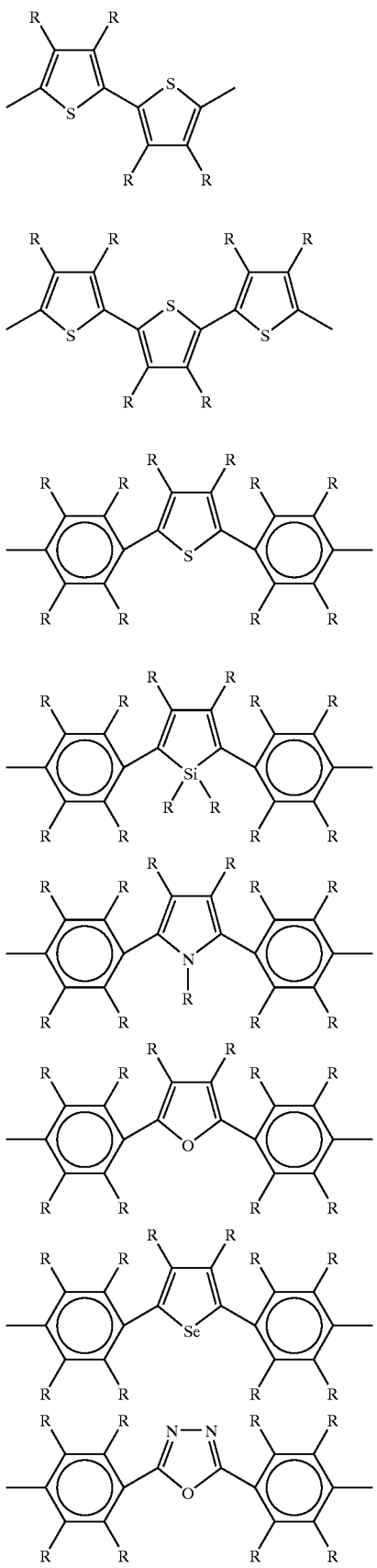

[Formula 16]

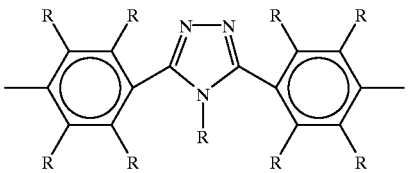

R represents, each independently, a hydrogen atom, alkyl groups having 1 to 20 carbon atoms; alkoxy groups having 1 to 20 carbon atoms; alkylthio groups having 1 to 20 carbon atoms; alkylsilyl groups having 1 to 60 carbon atoms; alkylamino group having 1 to 40 carbon atoms; aryl groups having 6 to 60 carbon atoms; aryloxy groups having 6 to 60 carbon atoms; arylalkyl groups having 7 to 60 carbon atoms; arylalkoxy groups having 7 to 60 carbon atoms; arylalkenyl groups having 8 to 60 carbon atoms; arylalkynyl groups having 8 to 60 carbon atoms; arylamino groups having 6 to 60 carbon atoms; heterocyclic compound groups having 3 to 60 carbon atoms and cyano group.

In the above examples, a plurality of Rs are present in one structural formula, they may be the same or different, and they are selected independently each other. When $Ar_1$ has a plurality of substituents, they maybe the same or different. For enhancing the solubility into a solvent, it is preferable that at least one substituent other than a hydrogen atom is carried, and it is preferable that the symmetric property of the form of a repeating unit including a substituent is low.

When $R_1$, $R_2$ are substituents other than a hydrogen atom or a cyano group, examples of the alkyl group having 1 to 20 carbon atoms include methyl group, ethyl group, propyl group, butyl group, pentyl group, hexyl group, heptyl group, octyl group, nonyl group, decyl group, lauryl group, and the like. Among them, pentyl group, hexyl group, octyl group, and decyl group are suitable.

Examples of the alkoxy group having 1 to 20 carbon atoms include methoxy group, ethoxy group, propyloxy group, butoxy group, pentyloxy group, hexyloxy group, heptyloxy group, octyloxygroup, nonyloxygroup, decyloxygroup, lauryl oxy group, and the like. Among them, pentyloxy group, hexyloxy group, octyloxy group, and decyloxy group are suitable.

Examples of the alkylthio group having 1 to 20 carbon atoms include methylthio group, ethylthio group, propylthio group, butylthio group, pentylthio group, hexylthio group, heptylthio group, octylthio group, nonylthio group, decylthio group, laurylthio group, and the like. Among them, pentylthio group, hexylthio group, octylthio group, and decylthio group are suitable.

Examples of alkylsilyl group of 1 to 60 carbon atoms include: methylsilyl group, ethylsilyl group, propylsilyl group, butylsilyl group, pentylsilyl group, hexylsilyl group, heptylsilyl group, octylsilyl group, nonylsilyl group, decylsilyl group, laurylsilyl group, trimethylsilyl group, ethyldimethylsilyl group, propyldimethylsilyl group, butyldimethylsilyl group, pentyldimethylsilyl group, hexyldimethylsilyl group, heptyldimethylsilyl group, octyldimethylsilyl group, nonyldimethylsilyl group, decyldimethylsilyl group, lauryldimethylsilyl group and the like, and pentylsilyl group, hexylsilyl group, octylsilyl group, decylsilyl group, pentyldimethylsilyl group, hexyldimethylsilyl group, octyldimethylsilyl group and decyldimethylsilyl group are preferable.

Examples of alkylamino group having 1–40 carbon atoms include methylamino group, dimethylamino group, ethylamino group, propylamino group, butylamino group, pentylamino group, hexylamino group, heptylamino group, octylamino group, nonylamino group, decylamino group, laurylamino group, and the like. Among them, pentylamino group, hexylamino group, octylamino group, and decylamino group are suitable.

Examples of an aryl group having 6–60 carbon atoms include phenyl group, $C_1$–$C_{12}$ alkoxyphenyl group ($C_1$–$C_{12}$ represents that the number of carbon atoms are 1–12. Hereinafter, referred to as the same.), $C_1$–$C_{12}$ alkylphenyl group, 1-naphtyl group, 2-naphtyl group, and the like. Among them, $C_1$–$C_{12}$ alkoxyphenyl group, and $C_1$–$C_{12}$ alkylphenyl group are suitable.

Examples of an aryloxy group having 6–60 carbon atoms include phenoxy group, $C_1$–$C_{12}$ alkoxyphenoxy group, $C_1$–$C_{12}$ alkylphenoxy group, 1-naphtyloxy group, 2-naphtyloxy group, and the like. Among them, $C_1$–$C_{12}$ alkoxyphenoxy group, and $C_1$–$C_{12}$ alkylphenoxy group are suitable.

Examples of an arylalkyl group having 6–60 carbon atoms include phenyl-$C_1$–$C_{12}$ alkyl group, $C_1$–$C_{12}$ alkoxyphenyl-$C_1$–$C_{12}$ alkyl group, $C_1$–$C_{12}$ alkylphenyl-$C_1$–$C_{12}$ alkyl group, 1-naphtyl-$C_1$–$C_{12}$ alkyl group, 2-naphtyl-$C_1$–$C_{12}$ alkyl group, and the like. Among them, $C_1$–$C_{12}$ alkoxyphenyl-$C_1$–$C_{12}$ alkyl group, and $C_1$–$C_{12}$ alkylphenyl-$C_1$–$C_{12}$ alkyl group are suitable.

Examples of an arylalkoxy group having 6–60 carbon atoms include phenyl-$C_1$–$C_{12}$ alkoxy group, $C_1$–$C_{12}$ alkoxyphenyl-$C_1$–$C_{12}$ alkoxy group, $C_1$–$C_{12}$ alkylphenyl-$C_1$–$C_{12}$ alkoxy group, 1-naphtyl-$C_1$–$C_{12}$ alkoxy group, 2-naphtyl-$C_1$–$C_{12}$ alkoxy group, and the like. Among them, $C_1$–$C_{12}$ alkoxyphenyl-$C_1$–$C_{12}$ alkoxy group, and $C_1$–$C_{12}$ alkylphenyl-$C_1$–$C_{12}$ alkoxy group are suitable.

Examples of an arylamino group having 6–60 carbon atoms include phenylamino group, diphenylamino group, $C_1$–$C_{12}$ alkoxyphenylamino group, a di-($C_1$–$C_{12}$ alkoxyphenyl) amino group, a di-($C_1$–$C_{12}$ alkylphenyl) amino group, 1-naphtylamino group, 2-naphtylamino group, and the like. Among them, $C_1$–$C_{12}$ alkylphenylamino group, and a di-($C_1$–$C_{12}$ alkylphenyl) amino group are suitable.

Examples of a heterocyclic compound group having 4–60 carbon atoms include thienyl group, $C_1$–$C_{12}$ alkylthienyl group, pyroryl group, furyl group, pyridyl group, $C_1$–$C_{12}$ alkylpyridyl group, and the like. Among them, thienyl group, $C_1$–$C_{12}$ alkylthienyl group, pyridyl group, and $C_1$–$C_{12}$ alkylpyridyl group are suitable.

Among the examples of R, the substituent containing an alkyl chain can be either of linear, branched, or cyclic one, or the combination thereof. When it is not linear, exemplified are isoamyl group, 2-ethylhexyl group, 3,7-dimethyloctyl group, cyclohexyl group, 4-$C_1$–$C_{12}$ alkylcyclohexyl group, and the like. In order to improve the solubility to solvent of a polymeric fluorescent substance, it is suitable that a cyclic or branched alkyl chain is contained in one or more of the substituents $Ar_1$. Moreover, carbon atoms of a part of alkyl chain may be replaced by a group containing a hetero atom. Examples of hetero atoms include an oxygen atom, a sulfur atom, a nitrogen atom, and the like. Furthermore, among the examples of R, when an aryl group or a heterocyclic compound group is contained in the part, they can contain one or more substituents.

In the above formula (1), the symbol k is 0 or 1. $R_1$, $R_2$ in the above formula (1) represent each independently, a group selected from a hydrogen atom, an alkyl group having 1–20 carbon atoms, an aryl group having 6–20 carbon atoms, a heterocyclic compound group having 4–20 carbon atoms and cyano group.

When $R_1$, $R_2$ are substituents other than a hydrogen atom or a cyano group, examples of an alkyl group having 1–20 carbon atoms include methyl group, ethyl group, propyl group, butyl group, pentyl group, hexyl group, heptyl group, octyl group, nonyl group, decyl group, and lauryl group. Among them, methyl group, ethyl group, pentyl group, hexyl group, heptyl group, and octyl group are suitable.

Examples of an aryl group having 6–20 carbon atoms include phenyl group, $C_1$–$C_{12}$ alkoxyphenyl group, $C_1$–$C_{12}$ alkylphenyl group, 1-naphtyl group, 2-naphtyl group, and the like. Among them, phenyl group, and $C_1$–$C_{12}$ alkylphenyl group are suitable.

Examples of a heterocyclic compound group having 4–20 carbon atoms include thienyl group, $C_1$–$C_{12}$ alkylthienyl group, pyrrolyl group, furyl group, pyridyl group, $C_1$–$C_{12}$ alkylpyridyl group, and the like. Among them, thienyl group, $C_1$–$C_{12}$ alkylthienyl group, pyridyl group, $C_1$–$C_{12}$ alkylpyridyl group are suitable.

Moreover, as for the end group of a polymeric fluorescent substance, if the polymerizable group remains as it is, the light-emitting property and lifetime of a device using thereof may fall, and it can be protected by a stable group.

Preferable is a conjugated bond successively connected to the conjugated structure of the main chain. For example, structures bonding to an aryl group or a heterocyclic compound group through vinylene group are included. Specifically, a substituent such as the chemical formula 10 described in JP-A 9-45478 is exemplified.

For synthesizing this polymeric fluorescent substance, when the main chain has vinylene groups, there are exemplified methods described in JP-A No. 5-202355. Namely, there are exemplified polymerization of dialdehyde compounds with diphosphonium salt compounds by Wittig reaction, polymerization of divinyl compounds with dihalogen compounds or polymerization of vinylhalogen compound itself by Heck reaction, polymerization of dialdehyde compounds with bisphosphate ester compounds by Horner-Wadsworth-Emmons method, condensation polymerization by dehydrogenation method of a compound having two methyl halide groups, condensation polymerization by sulfonium salt decomposition method of a compound having two sulfonium base group, polymerization of dialdehyde compounds with diacetonitrile compounds by the Knoevenagel reaction, polymerization of dialdehyde compounds by McMurry reaction, and the like.

Further, when the main chain does not have a vinylene group, there are exemplified a method in which polymerization is conducted from the corresponding monomer by the Suzuki coupling reaction, a method in which polymerization is conducted by the Grignard reaction, a method in which polymerization is conducted using a Ni(0) catalyst, a method in which polymerization is conducted using an oxidizing agents such as $FeCl_3$ and the like, a method in which oxidation polymerization is conducted electrochemically, a method in which an intermediate polymer having a suitable releasing group is decomposed, and the like.

This polymeric fluorescent substance may contain other repeating unit than the repeating unit of the formula (1) in the range wherein luminescent property and charge transport property do not deteriorate. The repeating unit of the formula (1) or other unit than the repeating unit of the formula (1) may be connected via a non-conjugated unit, or such non-conjugated part may be also contained in the repeating unit. As the linkage structure, there are exemplified those shown in the following chemical formula 17, combinations of those shown in the following chemical formula 17 with a vinylene group, combinations of two or more of those shown in the following chemical formula 17, and the like. Herein, R's each independently represents a group selected from the group exemplified above, and Ar represents a hydrocarbon group of 6 to 60 carbon atoms. Specific examples of these groups are the same as those exemplified above.

[Formula 17]

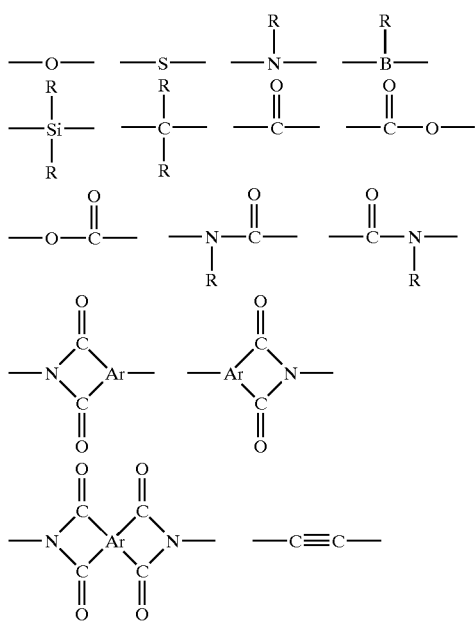

This polymeric fluorescent substance may also be a random, block or graft copolymer, or a polymer having an intermediate structure thereof, for example, a random copolymer having blocking property. From the viewpoint for obtaining a polymeric fluorescent substance having high fluorescent quantum yield, random copolymers having blocking property and block or graft copolymers are more preferable than complete random copolymers. Dendrimers or copolymers having branching in the main chain and having three or more terminals are also included.

Further, as the polymeric fluorescent substance, those emitting fluorescence in a solid state are suitably used, since the material utilizes light emission from a thin film.

As good solvents for the polymeric fluorescent substance, there are exemplified chloroform, methylene chloride, dichloroethane, tetrahydrofuran, toluene, xylene, mesitylene, tetralin, decalin, n-butylbenzene and the like. The polymeric fluorescent substance can be usually dissolved in these solvents in an amount of 0.1 wt % or more, though the amount differs depending on the structure and molecular weight of the polymeric fluorescent substance.

The polymeric fluorescent substance has a number-average molecular weight of $1 \times 10^3$ to $1 \times 10^7$ in terms of polystyrene, and the degree of polymerization thereof also changes depending on repeating structures and proportion thereof. In view of film forming property, generally the total amount of repeating structures is preferably from 20 to 10000, more preferably from 30 to 10000, particularly preferably from 50 to 5000.

When these polymeric fluorescent substances are used as a light-emitting material of a polymer LED, the purity thereof exerts an influence on light-emitting property, therefore, it is preferable that a monomer before polymerization is purified by a method such as distillation, sublimation purification, re-crystallization and the like before being polymerized and further, it is preferable to conduct a purification treatment such as re-precipitation purification, chromatographic separation and the like after the synthesis.

In the polymeric fluorescent substance of the present invention, the amount of water content is suitably not more than 1000 ppm (weight), more suitably not more than 500 ppm (weight), and further suitably not more than 50 ppm (weight).

Water content is measured by Karl Fischer method. Other various methods conventionally used, for example, weight measurement method of heat-drying by infrared radiation can be used conveniently.

When a polymeric fluorescent substance is soluble in a solvent for water content measurement of Karl Fischer method, the fluorescent substance can be used as in solid state for water content measurement. When a polymeric fluorescent substance is not easily soluble in a solvent for water content measurement of Karl Fischer method, the fluorescent substance is dissolved in another solvent which can dissolve said fluorescent substance well enough and is well dried, then the water content of the solution is measured by Karl Fischer method, and the water content of the fluorescent substance can be obtained.

AS a method for lowering the water content, various methods are applicable in each step of taking out, washing, drying at the time of manufacturing a polymeric fluorescent substance. For example, after the preparation of a polymeric fluorescent substance, taking out treatment is conducted by using a dried solvent under dryness atmosphere at the time of taking out. As the washing method, method of washing a polymeric fluorescent substance using a water-repellent solvent etc. can be considered. As the drying method, heat-drying, reduced pressure- or vacuum-drying, and combination thereof are exemplified.

The polymeric fluorescent substance solution of the present invention contains 0.1 to 5% by weight of a polymeric fluorescent substance and the water content is not more than 1000 ppm (weight) preferably not more than 500 ppm (weight). The water content also can be measured by Karl Fischer method.

The polymeric fluorescent substance solution of the present invention is suitably prepared by dissolving a polymeric fluorescent substance in a solvent having the water content of 1000 ppm (weight) or less. The method for producing the polymeric fluorescent substance solution of the present invention is not especially limited as long as the method which can make the water content of the solution 1000 ppm (weight) or less.

For example, (a) a method for obtaining a polymeric fluorescent substance solution, wherein the water content of the polymeric fluorescent substance solution is controlled to be below 1000 ppm (weight) by mixing the polymeric fluorescent substance and the solvent with adjusting the water content thereof beforehand, or (b) a method of drying a polymeric fluorescent substance solution by well-known various methods etc. is exemplified.

In the method of the above (b), it is suitable to use a solvent whose water content is below 1000 ppm (weight). It is more suitable to use a polymeric fluorescent substance having the specific water content and a solvent having the water content of 1000 ppm (weight) or less.

In the polymeric fluorescent substance of the present invention, the poor solvent content is suitably not more than 10000 ppm (weight), more suitably not more than 5000 ppm (weight), and further suitably not more than 3500 ppm (weight). The lower limit is not especially limited, but it is suitably 100 ppm (weight) or more in practical view.

Poor solvent content is measured by gas-chromatography method. Other various methods conventionally used, for example, weight measurement method of heat-drying by infrared radiation can be used conveniently.

In the gas-chromatography method, the poor solvent content can be determined with using a highly purified solvent whose impurity contents has been previously determined.

The poor solvent is an alcohol, and suitably selected from the group consisting of methanol, ethanol, and 2-propanol.

AS a method for lowering the poor solvent content, various methods are applicable in each step of taking out, washing, drying at the time of manufacturing a polymeric fluorescent substance. For example, after the preparation of a polymeric fluorescent substance, taking out treatment is conducted by using a volatile. As the washing method, method of washing a polymeric fluorescent substance using a volatile solvent etc. can be considered. As the drying method, heat-drying, reduced pressure- or vacuum-drying, and combination thereof are exemplified.

The polymer fluorescent substance solution of the present invention is suitably prepared by dissolving a polymeric fluorescent substance in a solvent in a concentration of 0.1 to 5% by weight. The solvent is selected from organic solvents such as chloroform, methylene chloride, dichloroethane, tetrahydrofuran, toluene, xylene, mesitylene, decalin, and n-butylbenzene. The content of the poor solvent in the solvent measured by gas-chromatography method is not more than 1000 ppm (weight), and preferably not more than 500 ppm.

As the organic solvents used for dissolving the polymer fluorescent substance, toluene, xylene and chloroform are suitable.

The method for obtaining the polymer fluorescent substance solution of the present invention is not limited specifically, as long as the content of poor solvents can be reduced to not more than 1000 ppm (weight).

For example, a polymer fluorescent substance of which the content of poor solvents can be previously adjusted to not more than 1000 ppm (weight) in the polymer fluorescent substance solution is mixed with a solvent to obtain a polymer fluorescent substance solution. In the above method, it is suitable to use a solvent whose content of poor solvent is not more than 1000 ppm (weight).

A polymer light-emitting device of the present invention comprises at least one light-emitting layer containing a polymer fluorescent substance, placed between a pair of an anode and a cathode at least one of which is transparent or semi-transparent, wherein the light-emitting layer does not contain substantially a particle-like foreign material having a diameter of more than 1 $\mu$m. The light-emitting layer is a layer which emits light, and an organic electroluminescent layer is an organic layer which emits light. The particle-like foreign material is a different material different from a material which constitutes the organic electroluminescent layer, and the maximum diameter of the particle-like foreign material is larger than the average thickness of the organic electroluminescent layer. The particle-like foreign material having a thickness more than 1 $\mu$m is a particle which can be trapped by a filter when a dispersed solution of the particle-like foreign materials is filtrated.

A process for producing the polymer light-emitting device of the present invention, wherein the light-emitting layer does not contain substantially a particle-like foreign material having a diameter of more than 1 $\mu$m, comprises steps of forming a light emitting layer by: preparing a coating material by filtrating a polymeric fluorescent substance solution through a filter having pore diameter of 1 $\mu$m or less; and forming a light-emitting layer using the polymeric fluorescent substance solution.

The process include coating the solution to form an organic electroluminescent layer on another layer constituting the polymer light-emitting device.

The filtrating process is not limited specifically as long as conducted between the step of synthesizing a polymeric electroluminescent substance and the step of coating for fabricating a device.

The material for coating is not limited especially as long as it can be coated, but suitably a solution in view of productivity.

The process for producing a coating agent includes a step of taking out the polymeric fluorescent substance as a solid from the filtrated polymeric fluorescent substance solution through a filter having pore diameter of 1 $\mu$m or less.

From the viewpoint of preventing of a particle-like foreign material mixing, preferable is a process which filtrates the solution containing a polymeric fluorescent substance with a filter having 1 $\mu$m of pore diameters, and prepares a coating agent.

As the method of taking out a polymeric fluorescent substance as a solid, for example, the filtrated solution is contacted with a poor solvent to a polymeric fluorescent substance to precipitate the fluorescent substance, a solid is obtained and dried. The coating solution can be obtained by dissolving the obtained solid in a solvent.

The process of the present invention may include a drying process, a process of storing a coating agent, a process of transporting a coating agent, a process of concentration adjusting, and other processes, in addition to the processes mentioned above.

The process may include a step of storing and/or transporting the coating material between the steps of preparing the coating material and forming a light-emitting layer by coating the material.

In the above process, it is suitable to prevent mixing of foreign materials or water. Thus, it is suitable to put into a container having a structure sealable from the open air, and to store and/or transport.

It is suitable to use a filter (filter paper) having uniform pore diameter. As the pore diameter which makes generating of dark spots few, it is usually 1 $\mu$m or less, and suitably 0.5 $\mu$m or less. The pore diameter means a pore diameter measured by bubble point test method according to Japanese Industrial Standard JISK3832.

Although there is especially no limitation in the quality of the filter material, when using an organic solvent, a filter made from poly tetra-fluoro ethylene which has a high resistance to an organic solvent is suitable.

Concrete examples of the process include: a polymeric fluorescent substance solution is filtrated then used for coating; a polymeric fluorescent substance is prepared then stored, and filtrated just before coating; after preparing a polymeric fluorescent substance to make and a solution thereof, filtrating the solution, taking out a polymeric fluorescent substance from the filtrated solution as a solid, storing it as a solid state, and the method of coating as a solution after storage by solid state is illustrated, and then coating as a solution. Among these, filtrating just before coating is suitable. In addition, filtration can be conducted several times.

The number of foreign materials in an organic film can be observed by a microscope. It can be conveniently observed as dark spots by fabricating a device and emitting. In this case, in order to distinguish from the dark spots derived from the substrate, the number of dark spots derived from the foreign material in an organic film can be mostly counted by comparing the number of the dark spots of the device fabricated using a solution before filtration with a solution after filtration.

It is more suitable, as the number of the dark spots is less. Since the size of a pixel in a dot matrix device is 300 μm squares in many cases, supposing that the generation of dark spots is less than two in one pixel, it is preferable that there are dark spots of $18/mm^2$ or less.

The polymer LED of the present invention is a polymer LED comprising a pair of electrodes composed of an anode and a cathode at least one of which is transparent or semitransparent and a light-emitting layer disposed between the electrodes, and a polymeric fluorescent substance of the present invention is contained in the light-emitting layer.

Further, the polymer LED of the present invention is a polymer LED comprising a pair of electrodes composed of an anode and a cathode at least one of which is transparent or semitransparent and a light-emitting layer disposed between the electrodes, and a polymeric fluorescent substance is produced with using the polymeric fluorescent substance of the present invention.

As the polymer LED of the present invention, there are listed polymer LEDs having an electron-transporting layer disposed between a cathode and a light-emitting layer, polymer LEDs having a hole-transporting layer disposed between an anode and a light-emitting layer, polymer LEDs having an electron-transporting layer disposed between a cathode and a light-emitting layer and having a hole-transporting layer disposed between an anode and a light-emitting layer.

For example, the following structures a) to d) are specifically exemplified.

a) anode/light-emitting layer/cathode
b) anode/hole-transporting layer/light-emitting layer/cathode
c) anode/light-emitting layer/electron-transporting layer//cathode
d) anode/hole-transporting layer/light-emitting layer/electron-transporting layer/cathode (wherein, "/" indicates adjacent lamination of layers. Hereinafter, referred to as the same)

Herein, the light-emitting layer is a layer having function to emit a light, the hole-transporting layer is a layer having function to transport a hole, and the electron-transporting layer is a layer having function to transport an electron. Herein, the electron-transporting layer and the hole-transporting layer are generically called a charge-transporting layer.

The light-emitting layer, hole-transporting layer and electron-transporting layer may also each independently used in two or more layers.

Of charge-transporting layers disposed adjacent to an electrode, that having function to improve charge-injecting efficiency from the electrode and having effect to decrease driving voltage of an device are particularly called sometimes a charge-injecting layer (hole-injecting layer, electron-injecting layer) in general.

For enhancing adherence with an electrode and improving charge injection from an electrode, the above-described charge-injecting layer or insulation layer having a thickness of 2 nm or less may also be provided adjacent to an electrode, and further, for enhancing adherence of the interface, preventing mixing and the like, a thin buffer layer may also be inserted into the interface of a charge-transporting layer and light-emitting layer.

The order and number of layers laminated and the thickness of each layer can be appropriately applied while considering light-emitting efficiency and life of the device.

In the present invention, as the polymer LED having a charge-injecting layer (electron-injecting layer, hole-injecting layer) provided, there are listed a polymer LED having a charge-injecting layer provided adjacent to a cathode and a polymer LED having a charge-injecting layer provided adjacent to an anode.

For example, the following structures e) to p) are specifically exemplified.

e) anode/charge-injecting layer/light-emitting layer/cathode
f) anode/light-emitting layer/charge injecting layer/cathode
g) anode/charge-injecting layer/light-emitting layer/charge-injecting layer/cathode
h) anode/charge-injecting layer/hole-transporting layer/light-emitting layer/cathode
i) anode/hole-transporting layer/light-emitting layer/charge-injecting layer/cathode
j) anode/charge-injecting layer/hole-transporting layer/light-emitting layer/charge-injecting layer/cathode
k) anode/charge-injecting layer/light-emitting layer/electron-transporting layer/cathode
l) anode/light-emitting layer/electron-transporting layer/charge-injecting layer/cathode
m) anode/charge-injecting layer/light-emitting layer/electron-transporting layer/charge-injecting layer/cathode
n) anode/charge-injecting layer/hole-transporting layer/light-emitting layer/electron-transporting layer/cathode
o) anode/hole-transporting layer/light-emitting layer/electron-transporting layer/charge-injecting layer/cathode
p) anode/charge-injecting layer/hole-transporting layer/light-emitting layer/electron-transporting layer/charge-injecting layer/cathode As the specific examples of the charge-injecting layer, there are exemplified layers containing an conducting polymer, layers which are disposed between an anode and a hole-transporting layer and contain a material having an ionization potential between the ionization potential of an anode material and the ionization potential of a hole-transporting material contained in the hole-transporting layer, layers which are disposed between a cathode and an electron-transporting layer and contain a material having an electron affinity between the electron affinity of a cathode material and the electron affinity of an electron-transporting material contained in the electron-transporting layer, and the like.

When the above-described charge-injecting layer is a layer containing an conducting polymer, the electric conductivity of the conducting polymer is preferably $10^{-5}$ S/cm or more and $10^3$ S/cm or less, and for decreasing the leak current between light-emitting pixels, more preferably $10^{-5}$ S/cm or more and $10^2$ S/cm or less, further preferably $10^{-5}$ S/cm or more and $10^1$ S/cm or less.

Usually, to provide an electric conductivity of the conducting polymer of $10^{-5}$ S/cm or more and $10^3$ S/cm or less, a suitable amount of ions are doped into the conducting polymer.

Regarding the kind of an ion doped, an anion is used in a hole-injecting layer and a cation is used in an electron-injecting layer. As examples of the anion, a polystyrene sulfonate ion, alkylbenzene sulfonate ion, camphor sulfonate ion and the like are exemplified, and as examples of the cation, a lithium ion, sodium ion, potassium ion, tetrabutyl ammonium ion and the like are exemplified.

The thickness of the charge-injecting layer is for example, from 1 nm to 100 nm, preferably from 2 nm to 50 nm.

Materials used in the charge-injecting layer may properly be selected in view of relation with the materials of electrode and adjacent layers, and there are exemplified conducting polymers such as polyaniline and derivatives thereof, polythiophene and derivatives thereof, polypyrrole and derivatives thereof, poly(phenylene vinylene) and derivatives thereof, poly(thienylene vinylene) and derivatives thereof, polyquinoline and derivatives thereof, polyquinoxaline and derivatives thereof, polymers containing aromatic amine structures in the main chain or the side chain, and the like, and metal phthalocyanine (copper phthalocyanine and the like), carbon and the like.

The insulation layer having a thickness of 2 nm or less has function to make charge injection easy. As the material of the above-described insulation layer, metal fluoride, metal oxide, organic insulation materials and the like are listed. As the polymer LED having an insulation layer having a thickness of 2 nm or less, there are listed polymer LEDs having an insulation layer having a thickness of 2 nm or less provided adjacent to a cathode, and polymer LEDs having an insulation layer having a thickness of 2 nm or less provided adjacent to an anode.

Specifically, there are listed the following structures q) to ab) for example.

q) anode/insulation layer having a thickness of 2 nm or less/light-emitting layer/cathode r) anode/light-emitting layer/insulation layer having a thickness of 2 nm or less/cathode s) anode/insulation layer having a thickness of 2 nm or less/light-emitting layer/insulation layer having a thickness of 2 nm or less/cathode t) anode/insulation layer having a thickness of 2 nm or less/hole-transporting layer/light-emitting layer/cathode u) anode/hole-transporting layer/light-emitting layer/insulation layer having a thickness of 2 nm or less/cathode v) anode/insulation layer having a thickness of 2 nm or less/hole-transporting layer/light-emitting layer/insulation layer having a thickness of 2 nm or less/cathode w) anode/insulation layer having a thickness of 2 nm or less/light-emitting layer/electron-transporting layer/cathode x) anode/light-emitting layer/electron-transporting layer/insulation layer having a thickness of 2 nm or less/cathode y) anode/insulation layer having a thickness of 2 nm or less/light-emitting layer/electron-transporting layer/insulation layer having a thickness of 2 nm or less/cathode z) anode/insulation layer having a thickness of 2 nm or less/hole-transporting layer/light-emitting layer/electron-transporting layer/cathode aa) anode/hole-transporting layer/light-emitting layer/electron-transporting layer/insulation layer having a thickness of 2 nm or less/cathode ab) anode/insulation layer having a thickness of 2 nm or less/hole-transporting layer/light-emitting layer/electron-transporting layer/insulation layer having a thickness of 2 nm or less/cathode In producing a polymer LED, when a film is formed from a solution by using such polymeric fluorescent substance soluble in an organic solvent, only required is removal of the solvent by drying after coating of this solution, and even in the case of mixing of a charge-transporting material and a light-emitting material, the same method can be applied, causing an extreme advantage in production. As the film forming method from a solution, there can be used coating methods such as a spin coating method, casting method, micro gravure coating method, gravure coating method, bar coating method, roll coating method, wire bar coating method, dip coating method, spray coating method, screen printing method, flexo printing method, offset printing method, inkjet printing method and the like.

Regarding the thickness of the light-emitting layer, the optimum value differs depending on material used, and may properly be selected so that the driving voltage and the light-emitting efficiency become optimum values, and for example, it is from 1 nm to 1 $\mu$m, preferably from 2 nm to 500 nm, further preferably from 5 nm to 200 nm.

In the polymer LED of the present invention, light-emitting materials other than the above-described polymeric fluorescent substance can also be mixed in a light-emitting layer. Further, in the polymer LED of the present invention, the light-emitting layer containing light-emitting materials other than the above-described polymeric fluorescent substance may also be laminated with a light-emitting layer containing the above-described polymeric fluorescent substance.

As the light-emitting material, known materials can be used. In a compound having lower molecular weight, there can be used, for example, naphthalene derivatives, anthracene or derivatives thereof, perylene or derivatives thereof; dyes such as polymethine dyes, xanthene dyes, coumarine dyes, cyanine dyes; metal complexes of 8-hydroxyquinoline or derivatives thereof, aromatic amine, tetraphenylcyclopentane or derivatives thereof, or tetraphenylbutadiene or derivatives thereof, and the like.

Specifically, there can be used known compounds such as those described in JP-A Nos. 57-51781, 59-195393 and the like, for example.

When the polymer LED of the present invention has a hole-transporting layer, as the hole-transporting materials used, there are exemplified polyvinylcarbazole or derivatives thereof, polysilane or derivatives thereof, polysiloxane derivatives having an aromatic amine in the side chain or the main chain, pyrazoline derivatives, arylamine derivatives, stilbene derivatives, triphenyldiamine derivatives, polyaniline or derivatives thereof, polythiophene or derivatives thereof, polypyrrole or derivatives thereof, poly(p-phenylenevinylene) or derivatives thereof, poly(2,5-thienylenevinylene) or derivatives thereof, or the like.

Specific examples of the hole-transporting material include those described in JP-A Nos. 63-70257, 63-175860, 2-135359, 2-135361, 2-209988, 3-37992 and 3-152184.

Among them, as the hole-transporting materials used in the hole-transporting layer, preferable are polymer hole-transporting materials such as polyvinylcarbazole or derivatives thereof, polysilane or derivatives thereof, polysiloxane derivatives having an aromatic amine compound group in the side chain or the main chain, polyaniline or derivatives thereof, polythiophene or derivatives thereof, poly(p-phenylenevinylene) or derivatives thereof, poly(2,5-thienylenevinylene) or derivatives thereof, or the like, and further preferable are polyvinylcarbazole or derivatives thereof, polysilane or derivatives thereof and polysiloxane derivatives having an aromatic amine compound group in the side chain or the main chain. In the case of a hole-transporting material having lower molecular weight, it is preferably dispersed in a polymer binder for use.

Polyvinylcarbazole or derivatives thereof are obtained, for example, by cation polymerization or radical polymerization from a vinyl monomer.

As the polysilane or derivatives thereof, there are exemplified compounds described in Chem. Rev., 89, 1359 (1989) and GB 2300196 published specification, and the like. For synthesis, methods described in them can be used, and a Kipping method can be suitably used particularly.

As the polysiloxane or derivatives thereof, those having the structure of the above-described hole-transporting material having lower molecular weight in the side chain or main chain, since the siloxane skeleton structure has poor hole-transporting property. Particularly, there are exemplified those having an aromatic amine having hole-transporting property in the side chain or main chain.

The method for forming a hole-transporting layer is not restricted, and in the case of a hole-transporting layer having lower molecular weight, a method in which the layer is formed from a mixed solution with a polymer binder is exemplified. In the case of a polymer hole-transporting material, a method in which the layer is formed from a solution is exemplified.

The solvent used for the film forming from a solution is not particularly restricted providing it can dissolve a hole-transporting material. As the solvent, there are exemplified chlorine solvents such as chloroform, methylene chloride, dichloroethane and the like, ether solvents such as tetrahydrofuran and the like, aromatic hydrocarbon solvents such as toluene, xylene and the like, ketone solvents such as acetone, methyl ethyl ketone and the like, and ester solvents such as ethyl acetate, butyl acetate, ethylcellosolve acetate and the like.

As the film forming method from a solution, there can be used coating methods such as a spin coating method, casting method, micro gravure coating method, gravure coating method, bar coating method, roll coating method, wire bar coating method, dip coating method, spray coating method, screen printing method, flexo printing method, offset printing method, inkjet printing method and the like, from a solution.

The polymer binder mixed is preferably that does not disturb charge transport extremely, and that does not have strong absorption of a visible light is suitably used. As such polymer binder, polycarbonate, polyacrylate, poly(methyl acrylate), poly(methyl methacrylate), polystyrene, poly(vinyl chloride), polysiloxane and the like are exemplified.

Regarding the thickness of the hole-transporting layer, the optimum value differs depending on material used, and may properly be selected so that the driving voltage and the light-emitting efficiency become optimum values, and at least a thickness at which no pin hole is produced is necessary, and too large thickness is not preferable since the driving voltage of the device increases. Therefore, the thickness of the hole-transporting layer is, for example, from 1 nm to 1 $\mu$m, preferably from 2 nm to 500 nm, further preferably from 5 nm to 200 nm.

When the polymer LED of the present invention has an electron-transporting layer, known compounds are used as the electron-transporting materials, and there are exemplified oxadiazole derivatives, anthraquinonedimethane or derivatives thereof, benzoquinone or derivatives thereof, naphthoquinone or derivatives thereof, anthraquinone or derivatives thereof, tetracyanoanthraquinodimethane or derivatives thereof, fluorenone derivatives, diphenyldicyanoethylene or derivatives thereof, diphenoquinone derivatives, or metal complexes of 8-hydroxyquinoline or derivatives thereof, and the like.

Specifically, there are exemplified those described in JP-A Nos. 63-70257, 63-175860, 2-135359, 2-135361, 2-209988, 3-37992 and 3-152184.

Among them, oxadiazole derivatives, benzoquinone or derivatives thereof, anthraquinone or derivatives thereof, or metal complexes of 8-hydroxyquinoline or derivatives thereof are preferable, and 2-(4-biphenyl)-5-(4-t-butylphenyl)-1,3,4-oxadiazole, benzoquinone, anthraquinone, tris(8-quinolinol)aluminum and polyquinoline are further preferable.

The method for forming the electron-transporting layer is not particularly restricted, and in the case of an electron-transporting material having lower molecular weight, a vapor deposition method from a powder, or a method of film-forming from a solution or a melted state is exemplified, and in the case of a polymer electron-transporting material, a method of film-forming from a solution or a melted state is exemplified, respectively. In case of film forming from a solution or a melted state, polymer binders may be used together.

The solvent used in the film-forming from a solution is not particularly restricted provided it can dissolve electron-transporting materials and/or polymer binders. As the solvent, there are exemplified chlorine solvents such as chloroform, methylene chloride, dichloroethane and the like, ether solvents such as tetrahydrofuran and the like, aromatic hydrocarbon solvents such as toluene, xylene and the like, ketone solvents such as acetone, methyl ethyl ketone and the like, and ester solvents such as ethyl acetate, butyl acetate, ethylcellosolve acetate and the like.

As the film-forming method from a solution or melted state, there can be used coating methods such as a spin coating method, casting method, micro gravure coating method, gravure coating method, bar coating method, roll coating method, wire bar coating method, dip coating method, spray coating method, screen printing method, flexo printing method, offset printing method, inkjet printing method and the like.

The polymer binder to be mixed is preferably that which does not extremely disturb a charge transport property, and that does not have strong absorption of a visible light is suitably used. As such polymer binder, poly(N-vinylcarbazole), polyaniline or derivatives thereof, polythiophene or derivatives thereof, poly(p-phenylene vinylene) or derivatives thereof, poly(2,5-thienylene vinylene) or derivatives thereof, polycarbonate, polyacrylate, poly(methyl acrylate), poly(methyl methacrylate), polystyrene, poly(vinyl chloride), polysiloxane and the like are exemplified.

Regarding the thickness of the electron-transporting layer, the optimum value differs depending on material used, and may properly be selected so that the driving voltage and the light-emitting efficiency become optimum values, and at least a thickness at which no pin hole is produced is necessary, and too large thickness is not preferable since the driving voltage of the device increases. Therefore, the thickness of the electron-transporting layer is, for example, from 1 nm to 1 $\mu$m, preferably from 2 nm to 500 nm, further preferably from 5 nm to 200 nm.

The substrate forming the polymer LED of the present invention may preferably be that does not change in forming an electrode and layers of organic materials and in electrolysis doping as well, and there are exemplified glass, plastics, polymer film, silicon substrates and the like. In the case of an opaque substrate, it is preferable that the opposite electrode is transparent or semitransparent.

In the present invention, it is preferable that an anode is transparent or semitransparent, and as the material of this anode, electron conductive metal oxide films, semitransparent metal thin films and the like are used. Specifically, there are used indium oxide, zinc oxide, tin oxide, and films (NESA and the like) fabricated by using an electron conductive glass composed of indium·tin·oxide (ITO), indium·zinc·oxide and the like, which are metal oxide complexes, and gold, platinum, silver, copper and the like are used, and among them, ITO, indium·zinc·oxide, tin oxide are preferable. As the fabricating method, a vacuum vapor deposition method, sputtering method, ion plating method, plating method and the like are used. As the anode, there may also be used organic transparent conducting films such as polyaniline or derivatives thereof, polythiophene or derivatives thereof and the like.

The thickness of the anode can be appropriately selected while considering transmission of a light and electric conductivity, and for example, from 10 nm to 10 μm, preferably from 20 nm to 1 μm, further preferably from 50 nm to 500 nm.

Further, for easy charge injection, there may be provided on the anode a layer comprising a phthalocyanine derivative conducting polymers, carbon and the like, or a layer having an average film thickness of 2 nm or less comprising a metal oxide, metal fluoride, organic insulating material and the like.

As the material of a cathode used in the polymer LED of the present invention, that having lower work function is preferable. For example, there are used metals such as lithium, sodium, potassium, rubidium, cesium, beryllium, magnesium, calcium, strontium, barium, aluminum, scandium, vanadium, zinc, yttrium, indium, cerium, samarium, europium, terbium, ytterbium and the like, or alloys comprising two of more of them, or alloys comprising one or more of them with one or more of gold, silver, platinum, copper, manganese, titanium, cobalt, nickel, tungsten and tin, graphite or graphite intercalation compounds and the like. Examples of alloys include a magnesium-silver alloy, magnesium-indium alloy, magnesium-aluminum alloy, indium-silver alloy, lithium-aluminum alloy, lithium-magnesium alloy, lithium-indium alloy, calcium-aluminum alloy and the like. The cathode may be formed into a laminated structure of two or more layers.

The thickness of the cathode can be appropriately selected while considering transmission of a light and electric conductivity, and for example, from 10 nm to 10 μm, preferably from 20 nm to 1 μm, further preferably from 50 nm to 500 nm.

As the method for fabricating a cathode, there are used a vacuum vapor deposition method, sputtering method, lamination method in which a metal thin film is adhered under heat and pressure, and the like. Further, there may also be provided, between a cathode and an organic layer, a layer comprising an conducting polymer, or a layer having an average film thickness of 2 nm or less comprising a metal oxide, metal fluoride, organic insulation material and the like, and after fabrication of the cathode, a protective layer may also be provided which protects the polymer LED. For stable use of the polymer LED for a long period of time, it is preferable to provide a protective layer and/or protective cover for protection of the device in order to prevent it from outside damage.

As the protective layer, there can be used a polymer compound, metal oxide, metal fluoride, metal borate and the like. As the protective cover, there can be used a glass plate, a plastic plate the surface of which has been subjected to lower-water-permeation treatment, and the like, and there is suitably used a method in which the cover is pasted with an device substrate by a thermosetting resin or light-curing resin for sealing. If space is maintained using a spacer, it is easy to prevent an device from being injured. If an inner gas such as nitrogen and argon is sealed in this space, it is possible to prevent oxidation of a cathode, and further, by placing a desiccant such as barium oxide and the like in the above-described space, it is easy to suppress the damage of an device by moisture adhered in the production process. Among them, any one means or more are preferably adopted.

For obtaining light emission in plane form using the polymer LED of the present invention, an anode and a cathode in the plane form may properly be placed so that they are laminated each other. Further, for obtaining light emission in pattern form, there are a method in which a mask with a window in pattern form is placed on the above-described plane light-emitting device, a method in which an organic layer in non-light emission part is formed to obtain extremely large thickness providing substantial non-light emission, and a method in which any one of an anode or a cathode, or both of them are formed in the pattern. By forming a pattern by any of these methods and by placing some electrodes so that independent on/off is possible, there is obtained a display device of segment type which can display digits, letters, simple marks and the like. Further, for forming a dot matrix device, it may be advantageous that anodes and cathodes are made in the form of stripes and placed so that they cross at right angles. By a method in which a plurality of kinds of polymeric fluorescent substances emitting different colors of lights are placed separately or a method in which a color filter or luminescence converting filter is used, area color displays and multi color displays are obtained.

A dot matrix display can be driven by passive driving, or by active driving combined with TFT and the like. These display devices can be used as a display of a computer, television, portable terminal, portable telephone, car navigation, view finder of a video camera, and the like.

Further, the above-described light-emitting device in plane form is a thin self-light-emitting one, and can be suitably used as a sheet light source for back-light of a liquid crystal display, or as a sheet light source for illumination. Further, if a flexible plate is used, it can also be used as a curved light source or a display.

The process for producing the polymer LED of the present invention comprises a step of forming a light emitting layer by using the polymeric fluorescent substance solution of the present invention, wherein the polymer light-emitting device comprises at least one light-emitting layer containing a polymeric fluorescent substance, placed between a pair of an anode and a cathode at least one of which is transparent or semi-transparent, wherein, the light-emitting layer contains a polymeric fluorescent substance having at least one repeating unit of the formula (1). As the method for forming a light emitting layer, a method of film forming from the above mentioned solution can be used.

EXAMPLES

The following examples further illustrate the present invention in detail but do not limit the scope thereof.

Herein, regarding the number average molecular weight, a number average molecular weight in terms of polystyrene was measured by gel permeation chromatography (GPC) using chloroform as a solvent.

Example 1

<Synthesis of Polymeric Fluorescent Substance 1>

1.83 g of 2,5-bis(chloromethyl)-4'-(3,7-dimethyloctyloxy)biphenyl, 1.63 g of 2-methyl-5-(3,7-dimethyloctyl)-p-xylylene dibromide, and 0.244 g of 2-methoxy-5-(2-ethylhexyloxy)-p-xylylene dichloride were dissolved in 660 g of dehydrated 1,4-dioxane. The system was purged with nitrogen by bubbling nitrogen through this solution for 20 minutes, then, the solution was heated up to 95° C. under nitrogen atmosphere. To this solution was added dropwise, over about 10 minutes, a solution prepared previously by dissolving 4.7 g of potassium t-butoxide in 80 g of dehydrated 1,4-dioxane. After the addition, they were polymerized for 2.5 hours at 97° C.

After the polymerization, the polymerized solution was cooled to 50° C., then, neutralized by addition of acetic acid. After cooling to room temperature, this polymerized solution was poured into 800 g of methanol, and the produced precipitate was recovered. This precipitate was washed with ethanol, then, dried under reduced pressure. 1.5 g of the resulted polymer was dissolved in 400 g of THF. This solution was poured into 800 g of methanol, and the produced precipitate was recovered. This precipitate was washed with ethanol, then, dried under reduced pressure to obtain 1.4 g of a polymer. This polymer is called Polymeric fluorescent substance 1. Polymeric fluorescent substance 1 had a number-average molecular weight of $2 \times 10^5$.

<Synthesis of Polymeric Fluorescent Substance 2>

0.66 g of diphosphonate obtained by reacting 1,4-bis(chloromethyl)-2-{4'-(3,7-dimethyloctyloxy)phenyl}benzene with triethyl phosphate, 0.11 g of diphosphonate obtained by reacting 2-methoxy-5-(2'-ethylhexyloxy)-p-xylylene dichloride with triethyl phosphite, and 0.50 g of 1,4-diformyl-2-{4'-(3,7-dimethyloctyloxy)phenyl}benzene were dissolved in 30 g of THF(dehydrated), and the atmosphere of the system was substituted with nitrogen. Into this solution, a half amount of a solution was added dropwise for about 20 minutes, wherein the solution was prepared by dissolving 0.46 g of tertiary butoxy potassium in 15 ml of THF(dehydrated), and nitrogen gas substitution was conducted by bubbling with nitrogen gas. After the dropwise addition, the reaction was continued at a room temperature for 1 hour. And then, the remaining half of tertiaty butoxy potassium solution was added in this reaction solution. After the addition, further reaction was conducted at a room temperature for 2 hours. Meanwhile, the above reactions were conducted under nitrogen gas atmosphere.

Next, it was neutralized by addition of acetic acid. In this solution, methanol was added and recovered precipitate. After washing with ethanol, the precipitate was dried under reduced pressure to obtain 0.74 g of a polymer.

Then, after dissolving the precipitate in small amount of chloroform, the precipitate was reprecipitated with methanol. The resultant resultant precipitate was washed with ethanol, and dried under reduced pressure to obtain 0.65 g of a polymer. The resultant polymer is called Polymeric fluorescent substance 2.

The number average molecular weight in terms of polystyrene of this Polymeric fluorescent substance 2 was $2.2 \times 10^4$.

<A Synthesis of a Polymeric Fluorescent Substance 3>

0.41 g of 4-bis(chloromethyl)-2-{4'-(3,7-dimethyloctyloxy)phenyl}benzene, 0.184 g of 1,4-bis(bromomethyl)-2-(dimethyloctylsilyl)benzene, 0.18 g of 2-methyl-5-(3,7-dimethyloctyl)-p-xylylene dibromide, and 0.0533 g of 2-methoxy-5-(2-ethylhexyloxy)-p-xylylene dichloride were dissolved in 200 g of 1,4-dioxane (dehydrated). The atmosphere of the system was substituted with nitrogen by nitrogen gas bubbling for 20 minutes, and the temperature of the solution was raised to 95° C. Into this solution, a solution was added dropwise for about 10 minutes, where the solution was prepared by dissolving 1.1 g of tertiary butoxy potassium in 30 ml of THF(dehydrated), and nitrogen gas bubbling was conducted. After the addition, further reaction was conducted at 95° C. for 2 hours. Meanwhile, the reactions were conducted under nitrogen gas atmosphere.

After cooling, the solution was neutralized by addition of acetic acid. In this solution, methanol was added and recovered the resulted precipitate. After washing with ethanol, the precipitate was dried under reduced pressure to obtain 0.40 g of a polymer. Then, after dissolving the precipitate in about 120 g of THF, the precipitate was purified by reprecipitation with methanol.

The resultant precipitate was washed with ethanol, and dried under reduced pressure to obtain 0.36 g of a polymer. The resultant polymer is called Polymeric fluorescent substance 3.

The number average molecular weight in terms of polystyrene of this Polymeric fluorescent substance 3 was $1.2 \times 10^5$.

Example 1

<Fabrication of Device and Evaluation>

A suspension of poly(3,4)ethylenedioxythiophene/polystyrenesulfonic acid (Baytron P TP AI 4083, manufactured by Bayer) was filtrated through a 0.5 $\mu$m membrane filter, then spin-coated on a glass substrate carrying thereon an ITO film having a thickness of 150 nm formed by a sputtering method, to give a film having a thickness of 70 nm, and dried for 1 hour at 120° C. in an oven. The Polymeric fluorescent substance 1 was dissolved in chloroform solution dried by molecular sieves to produce 0.4% solution. The water content of the chloroform solution was measured as not more than 1 ppm (weight) by Karl Fischer method. Then, using this solution, a light-emitting layer having a thickness of 100 nm was formed by spin-coating on the substrate having the ITO film coated with the above PEDOT. Further, this was dried for 1 hour at 80° C. under reduced pressure, then, lithium fluoride was deposited to give a thickness of about 0.4 nm, then, calcium was deposited to give a thickness of 40 nm, and aluminum was deposited to give a thickness of 70 nm as a cathode, to fabricate a polymer LED device. The degrees of vacuum in the depositions were all $8 \times 10^{-6}$ Torr or less. When a voltage of 5.0 V was applied on the resulted device, a current of a current density of 10 mA/cm$^2$ flowed, and EL light emission of yellow color having a luminance of 550 cd/m$^2$ was observed. In this operation, the light emission efficiency was 5.6 cd/A and the light emission spectrum of the device had a peak at 560 nm.

Comparative Example 1

0.04 g of pure water was added to 20 g of chloroform dried by molecular sieve, and a chloroform solution having 2000 ppm (weight) of water content was produced. Except using the water added chloroform solution, instead of using the chloroform solution dried by molecular sieves, a polymer LED device was produced as the same manner as that of Example 1.

When a voltage of 5.0 V was applied on the resulted device, a current of a current density of 5.6 mA/cm$^2$ flowed, and EL light emission of yellow color having a luminance of 150 cd/m$^2$ was observed. In this operation, the light emission efficiency was 2.7 cd/A.

Example 2

<Measurement of the Content of Organic Solvent>

0.48% (weight) of chloroform solution of the polymer fluorescent substance 1 was prepared, and the organic solvent content was measured by gas-chromatography method. 6.31 ppm (weight) of tetrahydrofuran and 12.6 ppm (weight) of methanol were contained. The content of the these solvent on the used chloroform was not more than the limit of detection, it was found that about 1300 ppm (weight) of tetrahydrofuran and about 2600 ppm (weight) of methanol were contained in the polymer fluorescent substance 1.

<Fabrication of Device and Evaluation>

A suspension of poly(3,4)ethylenedioxythiophene/polystyrenesulfonic acid (Baytron P AI 4083, manufactured by Bayer) was filtrated through a 0.5 μm membrane filter, then, spin-coated on a glass substrate carrying thereon an ITO film having a thickness of 150 nm formed by a sputtering method, to give a film having a thickness of 70 nm, and dried at 120° C. for 10 minutes on a hot plate. The Polymer fluorescent substance 1 was dissolved in toluene solvent (produced by Kanto Kagaku, EL grade) to produce 0.6% solution. Then, using this solution, a light-emitting layer having a thickness of 80 nm was formed by spin-coating on the substrate having the ITO film coated with the above PEDOT. Further, this was dried for 1 hour at 80° C. under reduced pressure, then, lithium fluoride was deposited to give a thickness of about 0.4 nm, then, calcium was deposited to give a thickness of 40 nm, and aluminum was deposited to give a thickness of 70 nm as a cathode, to fabricate a polymer LED device. The degrees of vacuum in the depositions were all $8 \times 10^{-6}$ Torr or less. When a voltage of 4.0 V was applied on the resulted device, a current of a current density of 10 mA/cm² flowed, and EL light emission of yellow color was observed. In this operation, the light emission efficiency was 7.2 cd/A and the light emission spectrum of the device had a peak at 556 nm.

Comparative Example 2

0.2 g of ethanol was added to 10 g of toluene, and a toluene solution having 19600 ppm (weight) of ethanol was produced. Using this solution, the above polymer fluorescent substance 1 was dissolved and prepared 0.6% solution. Except using solution, a polymer LED device was produced as the same manner as that of Example 3. When a voltage of 4.0 V was applied on the resulted device, EL light emission of yellow color was observed. In this operation, the light emission efficiency was 5.9 cd/A and the light emission spectrum of the device had a peak at 556 nm.

Examples 3–5

Using the polymeric fluorescent substance 2, 1.0% by weight of chloroform solution was prepared. Solutions were prepared by filtrating the above solution, respectively, through PTFE filter paper (0.2 μm by the Advantec Toyo Co., Inc., and 0.5 μm), and 1.0 μm PTFE filter paper (Acrodisc syringe filter) of Gelman Sciences Inc.

To a glass substrate attached ITO film in a thickness of 150 nm by spatter method, a suspension of poly-(3,4) ethylene dioxythiophene/polystyrene sulfonic acid (Bytron P TP AI4083, produced by Bayer) was filtrated through PETF filter paper having a pore diameter of 0.5 μm (produced by Advantec Toyo Co., Inc.), then a film in a thickness of about 50 nm was formed by spin coating and dried for 10 minutes at 120° C.

On the above film, films of light emitting layer were formed in a thickness of 100 nm–120 nm with using three kinds of chloroform solutions of the above polymeric fluorescent substance 2, respectively by spin coating.

Furthermore, after drying these at 80° C. under a reduced pressure for 1 hour, then the degree of vacuum reaches to $5 \times 10^{-5}$ Pa, AL-Li alloys containing 0.5% of Li was deposited in 50 nm thickness to produce an organic electroluminescence device.

To the resultant device, 0.1 mA is applied under nitrogen stream, and dark spots including the minimum viewable size within a range of 2 mm×2 mm were observed with a microscope in a magnification of 20. As shown in Table 1, the number of dark spots of the sample filtrated through the filter paper having pore diameter of not more than 1 μm decreases remarkably. Thus, it is recognized that the dark spots observed in Comparative Examples 3 and 4 were generated neither from electrodes, such as a transparent electrode, nor from the foreign materials or projections of the polythiophene derivative film, but from the foreign materials in the solution. These examples show that the foreign materials contained in the solution were removable by filtration through a filter paper having pore diameter of 1 μm or less.

A solution was prepared which was filtrated through 5.0 μm PTFE filter paper of florinate membrane type produced by Nihon Millipore, Inc. (Comparative Example 3). Another solution (comparative example 4) prepared was that is not filtrated.

Using these solution, organic electroluminescence devices were fabricated as the similar manner with Example 3, and the number of dark spots were counted.

The result of the number of dark spots of Examples 3–5 and Comparative Examples 3–4 is shown in Table 1.

TABLE 1

|  | Example 3 | Example 4 | Example 5 | Comparative Example 3 | Comparative Example 4 |
| --- | --- | --- | --- | --- | --- |
| polymeric fluorescent substance 3 | 5 | 8 | 3 | 183 | 250 |

Example 6

<Fabrication of Device and Evaluation>

With using the polymeric fluorescent substance 3, 0.75% by weight of a toluene solution was prepared. This solution was filtrated through 1.0 μm PTFE filter paper produced by Advantec Toyo Co., Inc. Using this solution, an organic electroluminescence device was fabricated as the same manner with Example 3, and the number of dark spots was counted.

Comparative Examples 5 and 6

Using the polymeric fluorescent substance 3, 0.75% by weight of a toluene solution was prepared.

A solution was prepared which was filtrated through 5.0 μm PTFE filter paper of florinate membrane type produced by Nihon Millipore, Inc. (Comparative Example 5). Another solution (comparative Example 6) prepared was that is not filtrated.

Using these solutions, organic electroluminescence devices were fabricated as the similar manner with Example 1, and the number of dark spots were counted.

The result of the number of dark spots of Example 6 and Comparative Examples 5–6 is shown in Table 2.

TABLE 2

|  | Example 6 | Comparative Example 5 | Comparative Example 6 |
| --- | --- | --- | --- |
| Polymeric fluorescent substance 4 | 31 | 86 | 113 |

Example 7

Using the polymeric fluorescent substance 3, 1% chloroform solution was prepared. The solution was filtrated through 0.5 μm PTFE filter paper produced by Advantec Toyo Co., Inc., and precipitated by charged into isopropyl alcohol, and the resultant precipitate was collected and dried. The precipitate was dissolved in toluene to prepare 0.75 wt % solution. Using the solution, an organic electroluminescence device was fabricated as the similar manner with Example 3, and the number of dark spots were counted to be 67.

The polymer LED manufactured with using the polymeric fluorescent substance or the polymeric fluorescent substance solution of the present invention has a higher luminous efficiency. Therefore, the polymer LED can be preferably used for devices, such as a light source of curved or flat shape, a segment type display device, and a flat panel display of a dot matrix, etc.

As the organic elelctroluminescence device of the present invention has few dark spots with retaining the preferable characteristics of the organic elelctroluminescence device, it can be preferably used for devices, such as a light source of flat shape, a flat panel display, etc.

What is claimed is:

1. A polymeric fluorescent substance which emits fluorescence in solid state, has a number-average molecular weight in terms of polystyrene of $1 \times 10^3$ to $1 \times 10^7$, and at least one repeating unit of the following general formula (1), and the amount of water content measured by Karl-Fischer method is not more than 1000 ppm (weight):

$$-Ar_1-(CR_1=CR_2)_k- \quad (1),$$

in the formula, $Ar_1$ is a divalent group forming carbon-carbon bonds with adjacent two groups respectively, the divalent group being an arylene group having 6 to 60 carbon atoms participating in conjugation or a heterocyclic compound group having 4 to 60 carbon atoms participating in conjugation, and the arylene group and heterocyclic compound group may further have a substituent; each of R1 and R2 independently represents a group selected from the group consisting of hydrogen atom, linear, branched or cyclic alkyl groups having 1 to 20 carbon atoms, aryl groups having 6 to 60 carbon atoms, heterocyclic compound groups having 4 to 60 carbon atoms and a cyano group, and the aryl group and heterocyclic compound group may further have a substituent; and the symbol k is 0 or 1.

2. The polymeric fluorescent substance according to claim 1, wherein the amount of water content is not more than 500 ppm (weight).

3. A polymeric fluorescent substance solution containing 0.1 to 5% by weight of a polymeric fluorescent substance which emits fluorescence in solid state, has a number-average molecular weight in terms of polystyrene of $1 \times 10^3$ to $1 \times 10^7$, and has at least one repeating unit represented by the above general formula (1) in claim 1, and the water content of the solution is not more than 1000 ppm (weight).

4. The polymeric fluorescent substance solution according to claim 3, being produced by dissolving a polymeric fluorescent substance in an organic solvent which can dissolve the polymeric fluorescent substance in an amount of 0.1 wt % or more, and has a water of not more than 1000 ppm (weight).

5. A polymer fluorescent substance which emits fluorescence in solid state, has a number-average molecular weight in terms of polystyrene of $1 \times 10^3$ to $1 \times 10^7$, has at least one repeating unit of the following general formula (1), and the amount of contained poor solvent measured by gas-chromatography method is not more than 3500 ppm (weight):

$$-Ar_1-(CR_1=CR_2)_k- \quad (1)$$

in the formula, $Ar_1$ is a divalent group forming carbon-carbon bonds with adjacent two groups respectively, the divalent group being an arylene group having 6 to 60 carbon atoms participating in conjugation or a heterocyclic compound group having 4 to 60 carbon atoms participating in conjugation, and the arylene group and heterocyclic compound group may further have a substituent; each of R1 and R2 independently represents a group selected from the group consisting of hydrogen atom, linear, branched or cyclic alkyl groups having 1 to 20 carbon atoms, aryl groups having 6 to 60 carbon atoms, heterocyclic compound groups having 4 to 60 carbon atoms and a cyano group, and the aryl group and heterocyclic compound group may further have a substituent; and the symbol k is 0 or 1.

6. The polymer fluorescent substance according to claim 5, wherein the poor solvent is selected from the group consisting of methanol, ethanol, and 2-propanol.

7. A polymer fluorescent substance solution in which a polymer fluorescent substance is dissolved in an organic solvent in a concentration of 0.1 to 5% by weight; the polymer fluorescent substance emits fluorescence in solid state, has a number-average molecular weight in terms of polystyrene of $1 \times 10^3$ to $1 \times 10^7$, has at least one repeating unit represented by the general formula $-Ar_1-(CR_1=CR_2)_k-$ (1), and an amount of a poor solvent measured by gas-chromatography method is not more than 1000 ppm (weight), wherein, in the formula, $Ar_1$ is a divalent group forming carbon-carbon bonds with adjacent two groups respectively, the divalent group being an arylene group having 6 to 60 carbon atoms participating in conjugation or a heterocyclic compound group having 4 to 60 carbon atoms participating in conjugation, and the arylene group and heterocyclic compound group may further have a substituent; each of R1 and R2 independently represents a group selected from the group consisting of hydrogen atom, linear, branched or cyclic alkyl groups having 1 to 20 carbon atoms, aryl groups having 6 to 60 carbon atoms, heterocyclic compound groups having 4 to 60 carbon atoms and a cyano group, and the aryl group and heterocyclic compound group may further have a substituent; and the symbol k is 0 or 1.

8. The polymer fluorescent substance solution according to claim 7, wherein the organic solvent is selected from the group consisting of chloroform, methylene chloride, dichloroethane, tetrahydrofuran, toluene, xylene, mesitylene, decalin, n-butylbenzene and tetramethylbenzene.

9. A process for producing a polymer light-emitting device comprising at least one light-emitting layer containing a polymer fluorescent substance, placed between a pair of an anode and a cathode at least one of which is transparent or semi-transparent, the light-emitting layer contains a polymer fluorescent substance, wherein said process contains a step of forming a light emitting layer by using a solution of the polymer fluorescent substance of claim 1 or 5.

10. A process for producing a polymer light-emitting device comprising at least one light-emitting layer containing a polymer fluorescent substance, placed between a pair of an anode and a cathode at least one of which is transparent or semi-transparent, wherein said process contains a step of forming a light emitting layer by using the polymer fluorescent substance solution of claim 3 or 7.

11. A polymer light-emitting device comprising at least one light-emitting layer containing a polymer fluorescent substance, placed between a pair of an anode and a cathode at least one of which is transparent or semi-transparent, wherein, the light-emitting layer contains a polymer fluorescent substance according to claim 1 or 5.

12. A polymer light-emitting device comprising at least one light-emitting layer containing a polymer fluorescent substance, placed between a pair of an anode and a cathode at least one of which is transparent or semi-transparent, wherein, the light-emitting layer is produced with using a polymer fluorescent substance solution according to claim 3 or 7.

13. The polymer light-emitting device according to claim 9, wherein a layer comprising an electron transporting compound is provided between a cathode and a light emitting layer, adjacent to said light emitting layer.

14. A polymer light-emitting device according to claim 9, wherein a layer comprising a hole transporting compound is provided between an anode and a light emitting layer, adjacent to said light emitting layer.

15. A polymer light-emitting device according to claim 9, wherein a layer comprising a hole transporting compound is provided between an anode and a light emitting layer, adjacent to said light emitting layer, and a layer comprising an electron transporting compound is provided between a cathode and a light emitting layer, adjacent to said light emitting layer.

16. A polymer light-emitting device comprising at least one light-emitting layer containing a polymer fluorescent substance having a water content not more than 1000 ppm or a poor solvent content not more than 3500 ppm, placed between a pair of an anode and a cathode at least one of which is transparent or semi-transparent, wherein the light-emitting layer does not contain substantially foreign material particles having a diameter of more than 1 μm.

17. A polymer light-emitting device according to claim 16, wherein the polymer fluorescent substance is soluble in organic solvent.

18. A polymer fluorescent device according to claim 16 or 17, wherein the polymer fluorescent substance emits fluorescence in solid state, has a number-average molecular weight in terms of polystyrene of $1 \times 10^3$ to $1 \times 10^7$, and has at least one repeating unit represented by the general formula (1),

$$—Ar_1—(CR_1=CR_2)_k— \qquad (1)$$

wherein, in the formula, $Ar_1$ is a divalent group forming carbon-carbon bonds with adjacent two groups respectively, the divalent group being an arylene group having 6 to 60 carbon atoms participating in conjugation or a heterocyclic compound group having 4 to 60 carbon atoms participating in conjugation, and the arylene group and heterocyclic compound group may further have a substituent; each of R1 and R2 independently represents a group selected from the group consisting of hydrogen atom, linear, branched or cyclic alkyl groups having 1 to 20 carbon atoms, aryl groups having 6 to 60 carbon atoms, heterocyclic compound groups having 4 to 60 carbon atoms and a cyano group, and the aryl group and heterocyclic compound group may further have a substituent; and the symbol k is 0 or 1.

19. A process for producing a polymer light-emitting device which comprises at least one light-emitting layer containing a polymeric fluorescent substance, wherein said light-emitting layer is placed between a pair of an anode and a cathode at least one of which is transparent or semi-transparent, wherein the process comprises steps of forming a light emitting layer by:
preparing a coating material by filtrating a polymeric fluorescent substance solution having a water content not more than 1000 ppm or a poor solvent content not more than 3500 ppm, through a filter having pore diameter of 1 μm or less; and
forming a light-emitting layer using the polymeric fluorescent substance solution.

20. A process for producing a polymer light-emitting device according to claim 19, wherein the step of preparing a coating material includes a step of taking out the polymeric fluorescent substance as a solid from the filtrated polymeric fluorescent substance solution through a filter having pore diameter of 1 μm or less.

21. A process for producing a polymer light-emitting device according to claim 19 or 20, wherein the process comprises a step of storing or transporting the coating material, or a combination of storing and transporting the coating material, between the steps of preparing the coating material and forming a light-emitting layer by coating the material.

22. A process for producing a polymer light-emitting device according to claim 19 or 21, wherein the coating material is a solution.

23. A polymer light-emitting device produced by a process according to claim 19 or 20.

24. A sheet light source using a polymer light-emitting device according to claim 16 or 17.

25. A segment display apparatus using a polymer light-emitting device according to claim 16 or 17.

26. A dot matrix display apparatus using a polymer light-emitting device according to claim 16 or 17.

27. A liquid crystal display apparatus using a polymer light-emitting device according to claim 16 or 17 as a back light.

28. The polymer light emitting device according to claim 10, wherein a layer comprising an electron transporting compound is provided between a cathode and a light emitting layer, adjacent to said light emitting layer.

29. The polymer light emitting device according to claim 11, wherein a layer comprising an electron transporting compound is provided between a cathode and a light emitting layer, adjacent to said light emitting layer.

30. The polymer light emitting device according to claim 12, wherein a layer comprising an electron transporting compound is provided between a cathode and a light emitting layer, adjacent to said light emitting layer.

31. The polymer light emitting device according to claim 10, wherein a layer comprising a hole transporting compound is provided between an anode and a light emitting layer, adjacent to said light emitting layer.

32. The polymer light emitting device according to claim 11, wherein a layer comprising a hole transporting compound is provided between an anode and a light emitting layer, adjacent to said light emitting layer.

33. The polymer light emitting device according to claim 12, wherein a layer comprising a hole transporting compound is provided between an anode and a light emitting layer, adjacent to said light emitting layer.

34. The polymer light emitting device according to claim 10, wherein a layer comprising a hole transporting compound is provided between an anode and a light emitting layer, adjacent to said light emitting layer, and a layer comprising an electron transporting compound is provided between a cathode and a light emitting layer, adjacent to said light emitting layer.

35. The polymer light emitting device according to claim 11, wherein a layer comprising a hole transporting compound is provided between an anode and a light emitting layer, adjacent to said light emitting layer, and a layer comprising an electron transporting compound is provided between a cathode and a light emitting layer, adjacent to said light emitting layer.

36. The polymer light emitting device according to claim 12, wherein a layer comprising a hole transporting compound is provided between an anode and a light emitting layer, adjacent to said light emitting layer, and a layer comprising an electron transporting compound is provided between a cathode and a light emitting layer, adjacent to said light emitting layer.

37. A process for producing a polymer light emitting device according to claim 21, wherein the coating material is a solution.

38. A polymer light emitting device produced by a process according to claim 21.

39. A sheet light source using a polymer light-emitting device according to claim 12.

40. A sheet light source using a polymer light-emitting device according to claim 13.

41. A sheet light source using a polymer light-emitting device according to claim 14.

42. A sheet light source using a polymer light-emitting device according to claim 15.

43. A sheet light source using a polymer light-emitting device according to claim 18.

44. A segment display apparatus using a polymer light-emitting device according to claim 12.

45. A segment display apparatus using a polymer light-emitting device according to claim 13.

46. A segment display apparatus using a polymer light-emitting device according to claim 14.

47. A segment display apparatus using a polymer light-emitting device according to claim 13.

48. A segment display apparatus using a polymer light-emitting device according to claim 18.

49. A dot matrix display apparatus using a polymer light-emitting device according to claim 12.

50. A dot matrix display apparatus using a polymer light-emitting device according to claim 13.

51. A dot matrix display apparatus using a polymer light-emitting device according to claim 14.

52. A dot matrix display apparatus using a polymer light-emitting device according to claim 15.

53. A dot matrix display apparatus using a polymer light-emitting device according to claim 18.

54. A liquid crystal display apparatus using a polymer light-emitting device according to claim 12 as a back light.

55. A liquid crystal display apparatus using a polymer light-emitting device according to claim 13 as a back light.

56. A liquid crystal display apparatus using a polymer light-emitting device according to claim 14 as a back light.

57. A liquid crystal display apparatus using a polymer light-emitting device according to claim 15 as a back light.

58. A liquid crystal display apparatus using a polymer light-emitting device according to claim 18 as a back light.

* * * * *